(12) United States Patent
Maeda

(10) Patent No.: US 12,365,493 B2
(45) Date of Patent: Jul. 22, 2025

(54) LIGHTING DEVICE AND LIGHTING SYSTEM

(71) Applicant: Panasonic Intellectual Property Management Co., Ltd., Osaka (JP)

(72) Inventor: Hikaru Maeda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 519 days.

(21) Appl. No.: 17/776,345

(22) PCT Filed: Nov. 17, 2020

(86) PCT No.: PCT/JP2020/042865
§ 371 (c)(1),
(2) Date: May 12, 2022

(87) PCT Pub. No.: WO2021/100721
PCT Pub. Date: May 27, 2021

(65) Prior Publication Data
US 2022/0408265 A1    Dec. 22, 2022

(30) Foreign Application Priority Data

Nov. 20, 2019   (JP) ................ 2019-209730

(51) Int. Cl.
*G06F 21/55*   (2013.01)
*G08B 5/36*   (2006.01)
(Continued)

(52) U.S. Cl.
CPC ............ *H04W 12/122* (2021.01); *G08B 5/36* (2013.01); *G08B 21/18* (2013.01); *B64U 2101/20* (2023.01); *B64U 2101/30* (2023.01)

(58) Field of Classification Search
CPC ....... H04W 12/122; G08B 5/36; G08B 21/18; B64U 2101/20; B64U 2101/30;
(Continued)

(56) References Cited

U.S. PATENT DOCUMENTS 10,391,977 B1 *   8/2019  Chhorn ............... B60R 25/31
2005/0242267 A1 * 11/2005  Lovato ............... H05B 47/115
                                                       356/213
(Continued)

FOREIGN PATENT DOCUMENTS

JP    2005-242754 A    9/2005
JP    2005-259065 A    9/2005
(Continued)

OTHER PUBLICATIONS

International Search Report (ISR) issued in International Application No. PCT/JP2020/042865, dated Jan. 26, 2021 w/English Translation.

*Primary Examiner* — Amie C. Lin
(74) *Attorney, Agent, or Firm* — Rimon P.C.

(57) ABSTRACT

A lighting device includes: a communication unit that communicates with a vehicle which drives autonomously; a diagnostic unit that performs, via the communication unit, diagnosis as to whether the vehicle is being hacked; and a light emitter that emits illumination light onto at least one of the vehicle, a road on which the vehicle travels, or a parking space in which the vehicle parks.

30 Claims, 28 Drawing Sheets

(51) Int. Cl.
*G08B 21/18* (2006.01)
*H04W 12/122* (2021.01)
*B64U 101/20* (2023.01)
*B64U 101/30* (2023.01)

(58) Field of Classification Search
CPC ... B64U 10/13; B64U 80/30; B60W 2556/45; B60W 50/0205; B60R 25/00; B60R 25/104; B64D 45/0015; G06F 21/55; G08G 1/09; H04B 10/116; H04Q 9/00; H05B 47/00; H05B 47/195
See application file for complete search history.

(56) References Cited

U.S. PATENT DOCUMENTS

| | | | |
|---|---|---|---|
| 2007/0182538 A1 | 8/2007 | Ota et al. | |
| 2007/0200688 A1* | 8/2007 | Tang | B60R 25/04 455/1 |
| 2009/0177352 A1 | 7/2009 | Grau et al. | |
| 2014/0012435 A1 | 1/2014 | Sugihara | |
| 2015/0336270 A1 | 11/2015 | Storr | |
| 2016/0072730 A1* | 3/2016 | Jubran | H04L 47/822 709/224 |
| 2017/0023945 A1* | 1/2017 | Cavalcanti | G08G 1/04 |
| 2017/0272450 A1* | 9/2017 | Krishnamurthi | G06F 21/35 |
| 2018/0307834 A1* | 10/2018 | Xue | G06F 21/554 |
| 2019/0213499 A1 | 7/2019 | Kita | |
| 2019/0220596 A1* | 7/2019 | Lie | G06F 18/24 |
| 2019/0260768 A1* | 8/2019 | Mestha | G06F 21/50 |
| 2019/0283711 A1* | 9/2019 | Moran | B60R 25/31 |
| 2019/0347410 A1* | 11/2019 | Kesarwani | G06F 16/903 |
| 2020/0254968 A1* | 8/2020 | Hassani | H04B 17/318 |
| 2021/0097315 A1* | 4/2021 | Carruthers | G08B 13/19645 |

FOREIGN PATENT DOCUMENTS

| | | |
|---|---|---|
| JP | 2006-244141 A | 9/2006 |
| JP | 2009-528520 A | 8/2009 |
| JP | 2014-003868 A | 1/2014 |
| JP | 2015-213041 A | 11/2015 |
| JP | 2016-506094 A | 2/2016 |
| JP | 5853205 B2 | 2/2016 |
| JP | 2019-008483 A | 1/2019 |
| JP | 2019-035261 A | 3/2019 |
| JP | 2019-075047 A | 5/2019 |
| JP | 2019-102023 A | 6/2019 |
| WO | 2014/071465 A1 | 5/2014 |

* cited by examiner

FIG. 3

| Questions about vehicle ||
|---|---|
| Questions that are uniquely answered | Questions that are not uniquely answered |
| ·Number of occupants<br>·Destination<br>·Seat position<br>·Temperature difference between inside and outside of vehicle<br>·Presence or absence of braking operation | ·Feeling or mood of owner<br>·Criterion for determining travel route<br>·Level of satisfaction<br>·Level of happiness<br>·Weather conditions |

FIG. 4

| Software resilience checking action |||
|---|---|---|
| DoS attack | Buffer overflow attack | Transmission of trap data |
| Transmit massive amount of data or requests to software of vehicle | Transmit unallowable amount of data to microprocessor of vehicle | Set trap for checking unauthorized access or unauthorized intrusion |

FIG. 5

| Operation log ||||
|---|---|---|---|
| Date and time | Location | Speed | Steering wheel angle |
| MM/dd/ hh:mm | Latitude and longitude | X km/sec. | X degrees |
| ... | ... | ... | ... |
| | | | |

FIG. 14

| Timing | | Lighting state |
|---|---|---|
| Start of diagnosis (turn on switch) | | Fully turned on |
| During diagnosis (during communication) | | Blink |
| Diagnosis result | Not being hacked | Emit light of blue color |
| | Being hacked | Emit light of red color |

FIG. 18
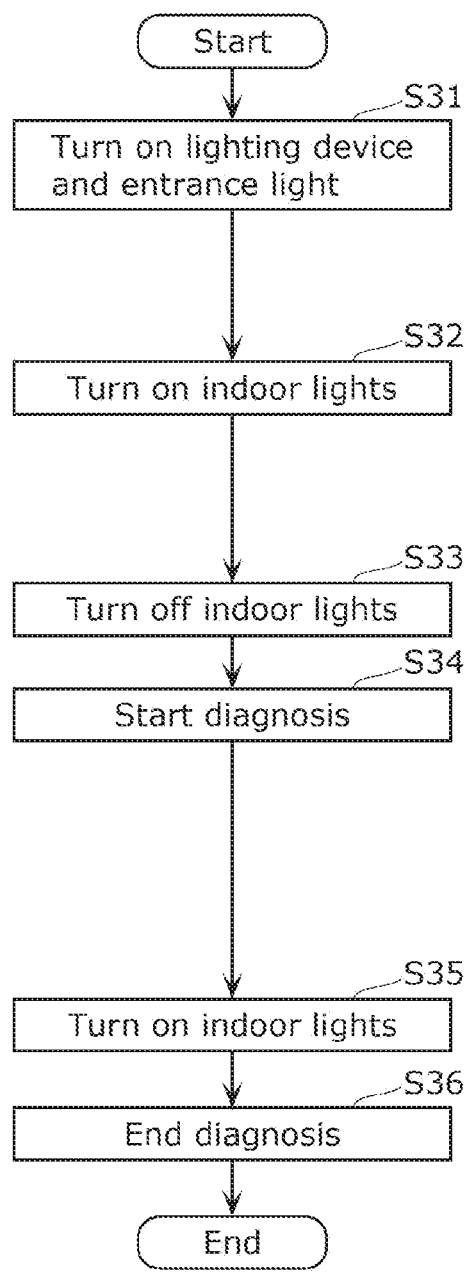
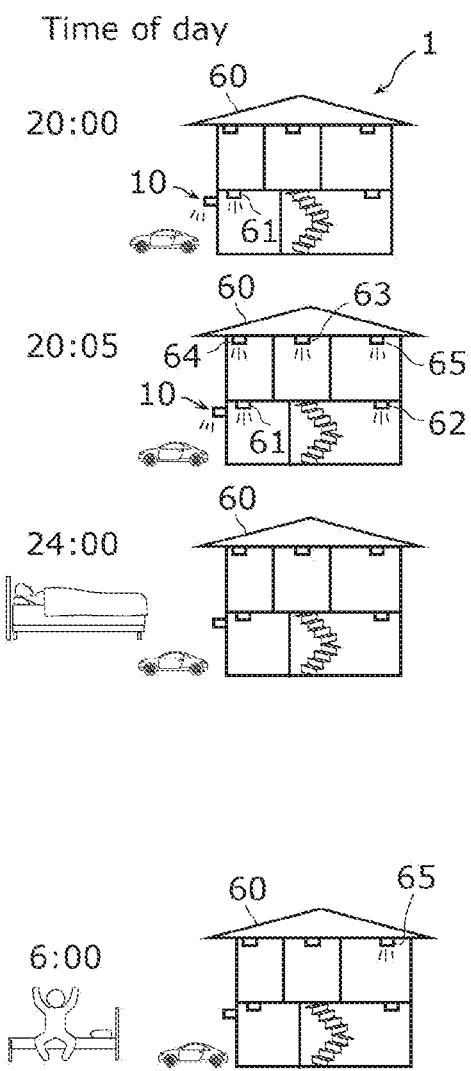

FIG. 19
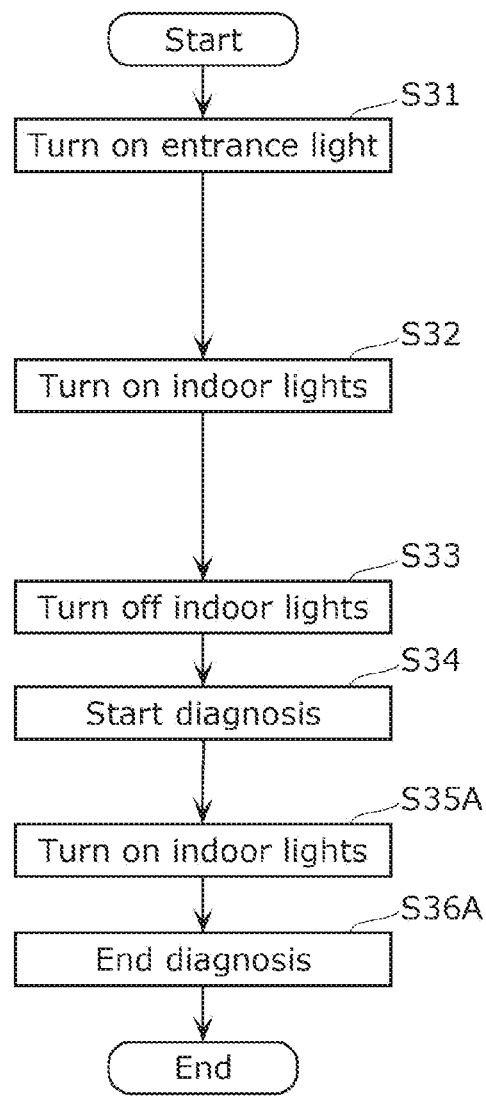
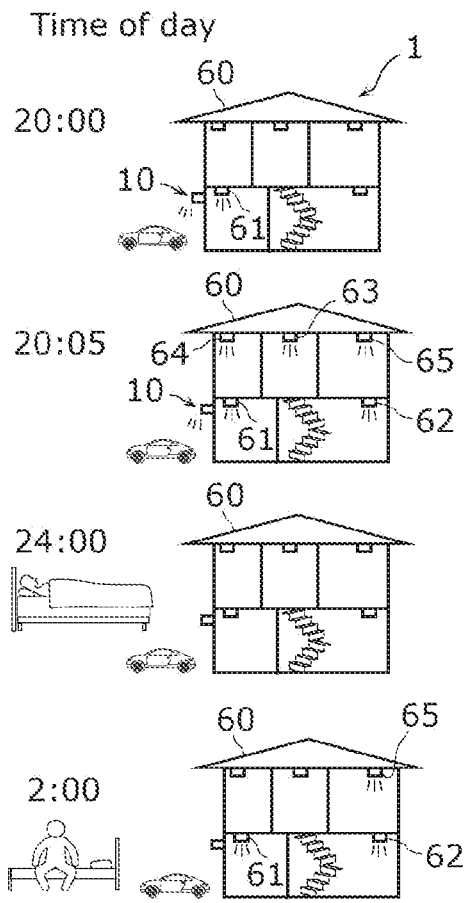

LIGHTING DEVICE AND LIGHTING SYSTEM

CROSS-REFERENCE OF RELATED APPLICATIONS

This application is the U.S. National Phase under 35 U.S.C. § 371 of International Patent Application No. PCT/JP2020/042865, filed on Nov. 17, 2020, which in turn claims the benefit of Japanese Application No. 2019-209730, filed on Nov. 20, 2019, the entire disclosures of each of which Applications are incorporated by reference herein in their entirety.

TECHNICAL FIELD

The present disclosure relates to a lighting device and a lighting system that have a function of diagnosing a vehicle, or the like.

BACKGROUND ART

A street light that emits illumination light onto a road is conventionally known. As an example of the street light, Patent Literature (PTL) 1 discloses a street light that notifies a hazardous area and a safe area when a disaster occurs.

CITATION LIST

Patent Literature

[PTL 1] Japanese Unexamined Patent Application Publication No. 2015-213041

SUMMARY OF INVENTION

Technical Problem

However, as with the street light disclosed in PTL 1, there are cases where road safety cannot be sufficiently improved by merely notifying a hazardous area during a disaster. For example, regardless of whether a disaster occurs, when an autonomously driving vehicle is subjected to hacking (unauthorized outside operation) by a third party, there is the problem of causing damage to the hacked vehicle and to other vehicles. In response to this problem, for example, if it is possible in everyday life to readily diagnose whether a vehicle or the like, which is a mobile body, is being hacked, damage due to hacking of the vehicle, or the like, can be reduced.

In view of this, the present disclosure has an object to provide a lighting device, and the like, capable of diagnosing whether a vehicle, or the like, is being hacked.

Solution to Problem

In order to achieve the aforementioned object, an aspect of the lighting device according to the present disclosure includes: a communication unit that communicates with a vehicle which drives autonomously; a diagnostic unit that performs, via the communication unit, diagnosis as to whether the vehicle is being hacked; and a light emitter that emits illumination light onto at least one of the vehicle, a road on which the vehicle travels, or a parking space in which the vehicle parks.

In order to solve the aforementioned problem, an aspect of the lighting system according to the present disclosure includes: the lighting device described above; and an information terminal that communicates with the lighting device.

Furthermore, in order to achieve the aforementioned object, an aspect of the lighting system according to the present disclosure includes: a lighting device including a communication unit that communicates with a vehicle which drives autonomously, and a light emitter that emits illumination light onto at least one of the vehicle, a road on which the vehicle travels, or a parking space in which the vehicle parks; and a vehicle diagnostic device that is communicatively connected to the communication unit and performs, via the communication unit, diagnosis as to whether the vehicle is being hacked.

Furthermore, in order to achieve the aforementioned object, an aspect of the lighting system according to the present disclosure includes: a lighting device that emits illumination light onto at least one of a vehicle which drives autonomously, a road on which the vehicle travels, or a parking space in which the vehicle parks; and a vehicle diagnostic device including a communication unit that communicates with the lighting device and the vehicle, and a diagnostic unit that performs, via the communication unit, diagnosis as to whether the vehicle is being hacked.

Furthermore, in order to achieve the aforementioned object, an aspect of the lighting device according to the present disclosure includes: a communication unit that communicates with a mobile body which drives autonomously; a diagnostic unit that performs, via the communication unit, diagnosis as to whether the mobile body is being hacked; and a light emitter that emits illumination light onto at least one of the mobile body, a road along a travel path in which the mobile body travels, or a waiting area in which the mobile body waits.

Advantageous Effects of Invention

The lighting device, and the like, according to the present disclosure are capable of diagnosing whether a vehicle, or the like, is being hacked. Accordingly, damage due to the hacking of the vehicle, etc., can be reduced.

BRIEF DESCRIPTION OF DRAWINGS

FIG. 3 is a diagram illustrating an example of questions asked to a vehicle by a diagnostic unit of the lighting device according to Embodiment 1.

FIG. 4 is a diagram illustrating software resilience checking actions performed on a vehicle by the lighting device according to Embodiment 1.

FIG. 5 is a diagram illustrating an example of an operation log of a vehicle obtained by a diagnostic unit of the lighting device according to Embodiment 1.

FIG. 14 is a diagram illustrating a lighting state of a light emitter of the lighting device according to Embodiment 2.

FIG. 18 is a flowchart illustrating an example of an operation of the lighting system according to Embodiment 3.

FIG. 19 is a flowchart illustrating another example of the operation of the lighting system according to Embodiment 3.

DESCRIPTION OF EMBODIMENTS

A lighting system according to the subsequent embodiments has a diagnostic function of diagnosing whether a vehicle, or the like, that drives autonomously is being hacked by a third party. Because the lighting system has the aforementioned diagnostic function, it is possible to prevent damage due to hacking of a vehicle or the like. It should be noted that, in the subsequent embodiments, hacking refers to a stranger performing unauthorized access of a computer to cause unintended operation or preventing normal operation of the computer.

Hereinafter, embodiments will be described in detail with reference to the Drawings. Note that each of the following embodiments shows a specific example of the present disclosure. The numerical values, shapes, materials, structural components, the arrangement and connection of the structural components, steps, the processing order of the steps, etc., shown in the following embodiments are mere examples, and thus are not intended to limit the present disclosure. Furthermore, among the structural components described in the following embodiments, structural components not recited in any one of the independent claims which indicate embodiments according to aspects of the present disclosure are described as optional structural components. The embodiments of the present disclosure are not limited by the current independent claims, and may also be expressed by other independent claims.

It should be noted that the respective figures are not necessarily precise illustrations. Furthermore, in the respective figures, the same reference signs are given to structural components that are substantially the same, and overlapping description thereof may be omitted or simplified.

Embodiment 1

[1-1. Configuration of Lighting Device]

A configuration of lighting device 10 according to Embodiment 1 will be described with reference to FIG. 1 to FIG. 6.

Figure 1:
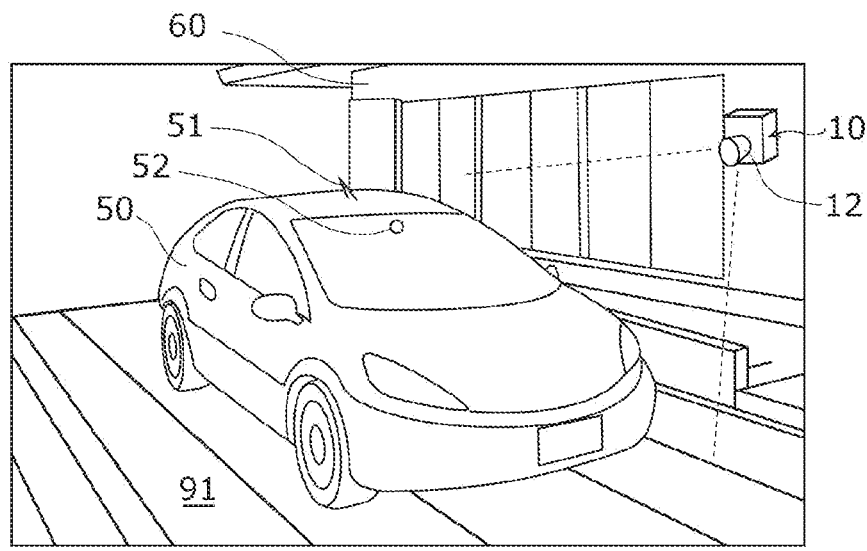
FIG. 1 is a diagram illustrating an example installation of a lighting device according to Embodiment 1.

FIG. 1 is a diagram illustrating an example installation of lighting device 10 according to Embodiment 1.

Lighting device 10 is installed in parking space 91 in which vehicle 50 is parked, and emits illumination light onto vehicle 50 and parking space 91. Although lighting device 10 is installed on an exterior wall of a house, which is an example of building 60, in FIG. 1, the present disclosure is not limited to this, and lighting device 10 may be installed on a roof, a fence, a pillar or the like of the house.

Vehicle 50 is a vehicle capable of autonomous driving, such as an automobile or a motorcycle. The autonomous driving means that the vehicle drives autonomously and includes not only unmanned driving but also that the driver is assisted in steering or braking the vehicle. Vehicle 50 may be a vehicle that can switch between a manual driving mode and an autonomous driving mode. Vehicle 50 is provided with communication antenna 51 for communicating with lighting device 10 and camera 52 that recognizes the illumination light of lighting device 10. Vehicle 50 has an AI assistant function (a software agent). Note that vehicle 50 is an example of a mobile body, which will be described later.

Figure 2:
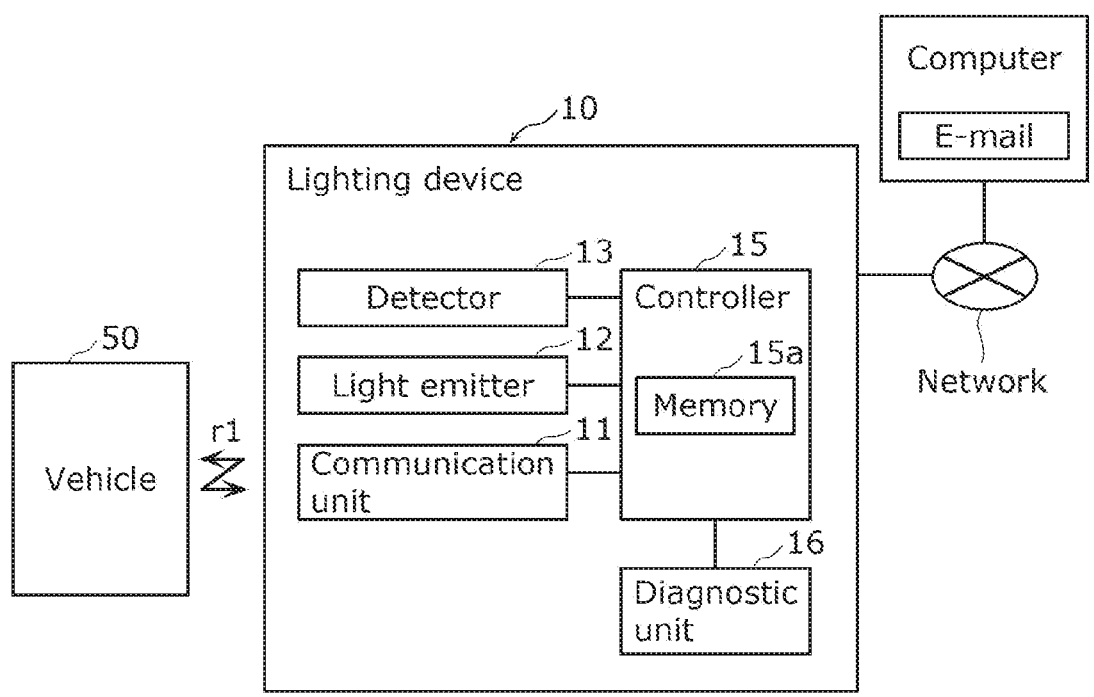
FIG. 2 is a block diagram illustrating a configuration of the lighting device according to Embodiment 1.

FIG. 2 is a block diagram illustrating a configuration of lighting device 10. FIG. 2 also illustrates a computer communicatively connected to lighting device 10 via a network.

As shown in FIG. 2, lighting device 10 includes communication unit 11 that communicates with vehicle 50, light emitter 12 that can emit illumination light, detector 13 that detects vehicle 50, and diagnostic unit 16 that diagnoses vehicle 50 as to whether an autonomous driving program of vehicle 50 is being hacked. Lighting device 10 further includes controller 15 that controls turning on and off, dimming, and toning of light emitter 12.

Light emitter 12 is a light source that emits illumination light, and is a liquid crystal projector that projects a static image or moving image or a light emitting diode (LED) light emitting module that emits light of red color, green color, or blue color, or synthetic light of these colors. Light emitter 12 may be a combination of separate surface mount devices (SMDs) and chips on board (COBs) of RGB, incandescent bulb color (2700K), neutral white color (5000K), and other colors. Light emitter 12 is provided at a position higher than the height of vehicle 50, in order to illuminate vehicle 50 and surroundings of vehicle 50.

Detector 13 is a sensor that detects the presence or absence of vehicle 50 in parking space 91, such as an image sensor, an infrared sensor, or a laser sensor. Detector 13 is constantly operating, and detects whether vehicle 50 is parked in parking space 91. In the present embodiment, light emitter 12 is turned on in response to detector 13 detecting vehicle 50, and diagnostic unit 16 is enabled to diagnose vehicle 50 in response to turning on of light emitter 12.

Communication unit 11 is a communication module that communicates with vehicle 50 by radio r1. The communication scheme based on radio r1 may be Bluetooth®, a specified low power radio using a frequency in the 920 MHz band, Zigbee®, or WiFi®, for example.

Controller 15 is formed by a microprocessor, memory 15a, and a program stored in memory 15a, for example. Memory 15a stores identification information on vehicle 50, such as a license plate number. An operation log and a diagnosis result of vehicle 50 described later are also recorded in memory 15a. Controller 15 controls turning on and the like of light emitter 12, and controls operations of communication unit 11, detector 13, and diagnostic unit 16.

When detector 13 detects vehicle 50, for example, controller 15 transmits, to vehicle 50, a request signal that requests for the identification information on vehicle 50 via communication unit 11. Controller 15 issues a diagnosis command to diagnostic unit 16 to make diagnostic unit 16 diagnose vehicle 50, when the identification information on vehicle 50 transmitted from vehicle 50 agrees with identification information registered in advance.

Instead of transmitting the request signal described above, controller 15 may establish a communication with vehicle 50, which is triggered by visible light communication from light emitter 12 to vehicle 50, and obtain the identification information on vehicle 50. In that case, vehicle 50 may decipher information transmitted by the visible light communication by means of camera 52, which is a signal receiver in the visible light communication, and transmit the identification information on vehicle 50 to lighting device 10. Controller 15 may obtain the identification information on vehicle 50 by imaging the license plate by means of detector 13. Instead of using detector 13, controller 15 may obtain the identification information on vehicle 50 by requesting for transmission of the identification information from vehicle 50 by regularly transmitting a beacon signal from communication unit 11. That is, controller 15 may detect vehicle 50 by means of communication unit 11 and then perform diagnosis via communication unit 11.

Diagnostic unit 16 is a circuit that diagnoses, via communication unit 11, whether vehicle 50 is being hacked. When the lighting state of light emitter 12 changes, for example, diagnostic unit 16 performs diagnosis of vehicle 50 parked in parking space 91. Specifically, diagnostic unit 16 performs diagnosis of the presence of hacking of vehicle 50 when light emitter 12 changes from an off state to an on state and diagnostic unit 16 has received a diagnosis command from controller 15.

Diagnostic unit 16 may perform diagnosis of the presence of hacking of vehicle 50 not only when light emitter 12 changes from the off state to the on state but also when light emitter 12 changes from the on state to the off state or a dimmed state or when the lighting color changes. Furthermore, diagnostic unit 16 may end the diagnosis of the presence of hacking of vehicle 50 when the lighting state changes again after light emitter 12 changes from the on state to the off state or the dimmed state or after the lighting color changes. Note that the dimmed state is a state in which a toning control is being performed so that the brightness of the light is less than or equal to a predetermined brightness, for example, a state where the lighting is controlled so that the illuminance is 30%. That the lighting color changes means a state where a toning control is performed so that the color temperature changes.

Here, a vehicle diagnosis by diagnostic unit 16 will be described with regard to three diagnosis examples.

A first diagnosis example is an example in which a vehicle diagnosis is performed based on an answer to a question asked to vehicle 50 by lighting device 10. Diagnostic unit 16 asks vehicle 50 a plurality of questions, and determines whether vehicle 50 is being hacked based on at least one of the answering time or the answer tendency to the questions.

FIG. 3 is a diagram illustrating an example of questions asked to vehicle 50 by diagnostic unit 16 of lighting device 10.

For example, diagnostic unit 16 asks vehicle 50 a question having a uniquely-determined answer via communication unit 11, and diagnoses that vehicle 50 is being hacked when the answering time to the question is slower than a predetermined time.

A question that is uniquely answered is a question as to the number of the occupants of vehicle 50, the destination of vehicle 50, the seat position of the owner of vehicle 50, the temperature difference between the inside and outside of the vehicle, or the presence of a braking operation, for example. The number of the occupants of vehicle 50 can be obtained with camera 52 of vehicle 50. The destination of vehicle 50 can be obtained with a car navigation system. The temperature difference between the inside and outside of the vehicle can be obtained with a temperature sensor. The seat position of the owner can be obtained by the owner registering the seat position in vehicle 50 in advance. The presence of a braking operation can be determined by an electronic control unit (ECU) of vehicle 50.

Since vehicle 50 can instantaneously obtain the number of the occupants, the destination, the seat position, the temperature difference, and the presence of a braking operation described above, vehicle 50 can answer the question in a short time if vehicle 50 is normal. Therefore, diagnostic unit 16 determines that vehicle 50 is being hacked when the answering time to the question is longer than a predetermined time, and determines that vehicle 50 is not being hacked when the answering time falls within the predetermined time. Note that the question that is uniquely answered and the answer to the question may be a question as to a steering operation command or a braking operation command, which are inspection items of the vehicle inspection (VI), and the response to such an operation command.

Furthermore, for example, diagnostic unit 16 asks vehicle 50 questions having answers that are non-uniquely-determined via communication unit 16, and diagnoses that vehicle 50 is being hacked when an amount of variation in the answers to the questions is smaller than a predetermined amount of variation. The variation of the answers means the degree of variation of answers to similar questions.

The question that is not uniquely answered is a question as to the mood or disposition of the owner, the criterion for determining the travel route, the level of satisfaction of the owner with vehicle 50, the level of happiness of the owner, or the weather conditions of the peripheral area of vehicle 50, for example. The mood or disposition of the owner can be determined by detecting words and actions of the owner with a microphone and camera 52 in the vehicle. The criterion for determining the travel route can be obtained from a favorite travel route of the owner registered in advance. The level of satisfaction of the owner with vehicle 50 can be determined by detecting how the owner treats or handles vehicle 50 with a microphone or camera 52. The level of happiness of the owner can be determined by detecting the facial expressions of the owner with camera 52. The weather conditions of the peripheral area of vehicle 50 can be obtained with camera 52 or a weather sensor provided in vehicle 50.

The mood or disposition of the owner, the criterion for determining the travel route, the level of satisfaction, the level of happiness, and the weather conditions described above vary with the weather, the traffic conditions, the price index, the work progress, interpersonal relationships or the like, and the answer will vary if vehicle 50 is normal. However, if vehicle 50 is being hacked by a third party, the variation of the answers is often small, or the answers are often similar. In view of this, diagnostic unit 16 determines that vehicle 50 is not being hacked when the variation of the answers to a plurality of questions is greater than or equal to a predetermined variation, and determines that vehicle 50 is being hacked when the variation of the answers is smaller than the predetermined variation.

In this way, lighting device 10 can diagnose whether vehicle 50 is being hacked through exchange of questions and answers between lighting device 10 and vehicle 50.

A second diagnosis example is an example in which a vehicle diagnosis is performed by checking the resilience of software that runs a travel system provided in vehicle 50. Diagnostic unit 16 performs the diagnosis by checking resilience of software which runs a travel system provided in vehicle 50, via communication unit 11. In addition, diagnostic unit 16 diagnoses that vehicle 50 is being hacked when a level of the resilience of the software is lower than a predetermined level. Note that in diagnosis of vehicle 50, checking the vulnerability of software is substantially the same as checking the resilience of software.

FIG. 4 is a diagram illustrating software resilience checking actions performed on vehicle 50 by lighting device 10.

For example, diagnostic unit 16 checks the resilience of the software by performing at least one of a denial-of-service (DoS) attack or a buffer overflow attack on vehicle 50 via communication unit 11. The DoS attack is to transmit a massive number of data packets or request packets to vehicle 50. The buffer overflow attack is to transmit an unallowable amount of data to a microprocessor of vehicle 50 to slow down the processing of the microprocessor.

When vehicle 50 is being hacked, such simulated attacks cause changes in vehicle 50, such as an extreme slowdown of the processing speed of software in vehicle 50. Therefore, diagnostic unit 16 performs such simulated attacks on vehicle 50, and determines that vehicle 50 is not being hacked when the resilience level of vehicle 50 does not decrease to below a predetermined level, and determines that vehicle 50 is being hacked when the resilience level decreases to below the predetermined level. As shown in Table 1, the resilience level of software means the level of resilience to the simulated attacks and transmission of trap data described later. The predetermined resilience level is set to level 5 or 4, for example.

TABLE 1

| Resilience level | Determination criterion |
| --- | --- |
| 5 | Resilient to both simulated attacks, DoS attack and buffer overflow attack, and transmission of trap data |
| 4 | Resilient to both simulated attacks, DoS attack and buffer overflow attack, and no backdoor is created to software |
| 3 | Resilient to both simulated attacks, DoS attack and buffer overflow attack, but a backdoor is created to software |
| 2 | Not resilient to both simulated attacks, DoS attack and buffer overflow attack |
| 1 | Not resilient to DoS attack |

For example, when the DoS attack causes the level of the resilience of the software to become lower than the predetermined level, diagnostic unit 16 may continue the DoS attack until the software of vehicle 50 ceases to function, to cause the travel system provided in vehicle 50 to shut down.

Furthermore, diagnostic unit 16 checks the resilience of the software by performing transmission of trap data to vehicle 50 via communication unit 11. The transmission of trap data is a measure against a backdoor created by a hacker. The trap data contains a trap for checking whether an important item, such as a log-in ID or vehicle inspection information, has been accessed by a hacker through a backdoor, or a trap for checking whether a hacker has intruded through a backdoor at the time of version up of software. Diagnostic unit 16 transmits trap data to vehicle 50, and determines that vehicle 50 is not being hacked when no unauthorized access or unauthorized intrusion has occurred, and determines that vehicle 50 is being hacked when the unauthorized access or unauthorized intrusion described above has occurred. For example, when a backdoor to the software is found through the transmission of the trap data, diagnostic unit 16 may diagnose that the level of the resilience of the software is lower than the predetermined level and that vehicle 50 is being hacked.

In this way, lighting device 10 can diagnose whether vehicle 50 is being hacked by checking the resilience of software in vehicle 50.

A third diagnosis example is an example in which an operation log of vehicle 50 is obtained, and a vehicle diagnosis is performed based on the operation log. Diagnostic unit 16 obtains an operation log of vehicle 50 via communication unit 11, and diagnoses that vehicle 50 is being hacked, when diagnostic unit 16 confirms that vehicle 50 is not following a predetermined operational regulation.

FIG. 5 is a diagram illustrating an example of an operation log of a vehicle obtained by diagnostic unit 16 of lighting device 10.

The operation log includes date and time, location (latitude and longitude), speed of vehicle 50, and steering wheel angle of vehicle 50, for example. The operational regulation is a regulation about sudden stop, the sudden start, the steering wheel turning angle, or the maximum speed of vehicle 50, for example. Diagnostic unit 16 determines whether vehicle 50 is driving according to the operational regulation. Diagnostic unit 16 determines that vehicle 50 has been hacked when vehicle 50 is not following a predetermined operational regulation, and determines that vehicle 50 has not been hacked when vehicle 50 is following the operational regulation.

In this way, whether vehicle 50 is being hacked can be diagnosed by diagnostic unit 16 obtaining an operation log of vehicle 50 and performing a vehicle diagnosis based on the operation log.

When diagnostic unit 16 has diagnosed that vehicle 50 is being hacked, controller 15 notifies that vehicle 50 is being hacked using illumination light from light emitter 12. For example, when light emitter 12 is a liquid crystal projector, controller 15 notifies information regarding hacking by illuminating vehicle 50 or parking space 91 with a static image or moving image projected by light emitter 12.

Figure 6:
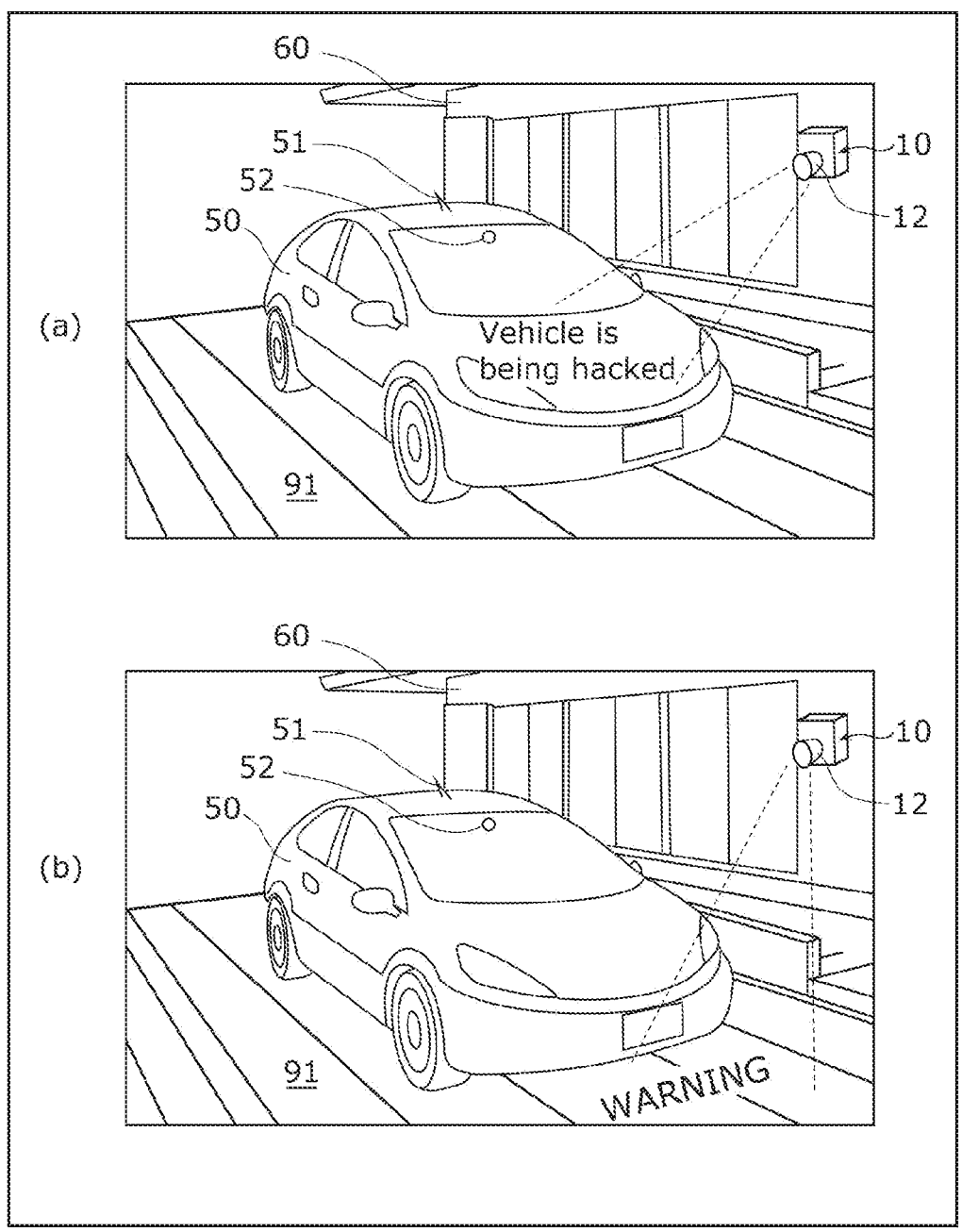
FIG. 6 is a diagram illustrating examples of the notification provided by a light emitter of the lighting device according to Embodiment 1.

FIG. 6 is a diagram illustrating examples of the notification provided by lighting device 10.

Part (a) of FIG. 6 illustrates an example in which light notifying that "vehicle is being hacked" is projected onto the hood of vehicle 50, and Part (b) of FIG. 6 illustrates an example in which light representing a word "WARNING" is projected onto the ground of parking space 91. The notification projected by light emitter 12 is not limited to characters but may be a mark, such as a figure, a symbol.

In this way, a user of vehicle 50 can visually know whether vehicle 50 is being hacked. Therefore, the user can take measures to cope with the hacked vehicle 50, and reduce damage due to the hacking of vehicle 50.

In another example of the notification of the diagnosis result, lighting device 10 may notify a computer communicatively connected to lighting device 10 via a network of the diagnosis result (see FIG. 2). For example, lighting device 10 may transmit the diagnosis result to a management server that is a computer owned by a dealer of vehicle 50. Lighting device 10 may also notify of the diagnosis result by transmitting an e-mail to an e-mail address registered by the owner or dealer in advance. This allows the owner or dealer to take measures to cope with the hacked vehicle 50 and reduce damage due to the hacking of vehicle 50.

[1-2. Operation of Lighting Device]

Next, an operation of lighting device 10 according to Embodiment 1 will be described with reference to FIG. 7 to FIG. 11.

Figure 7:
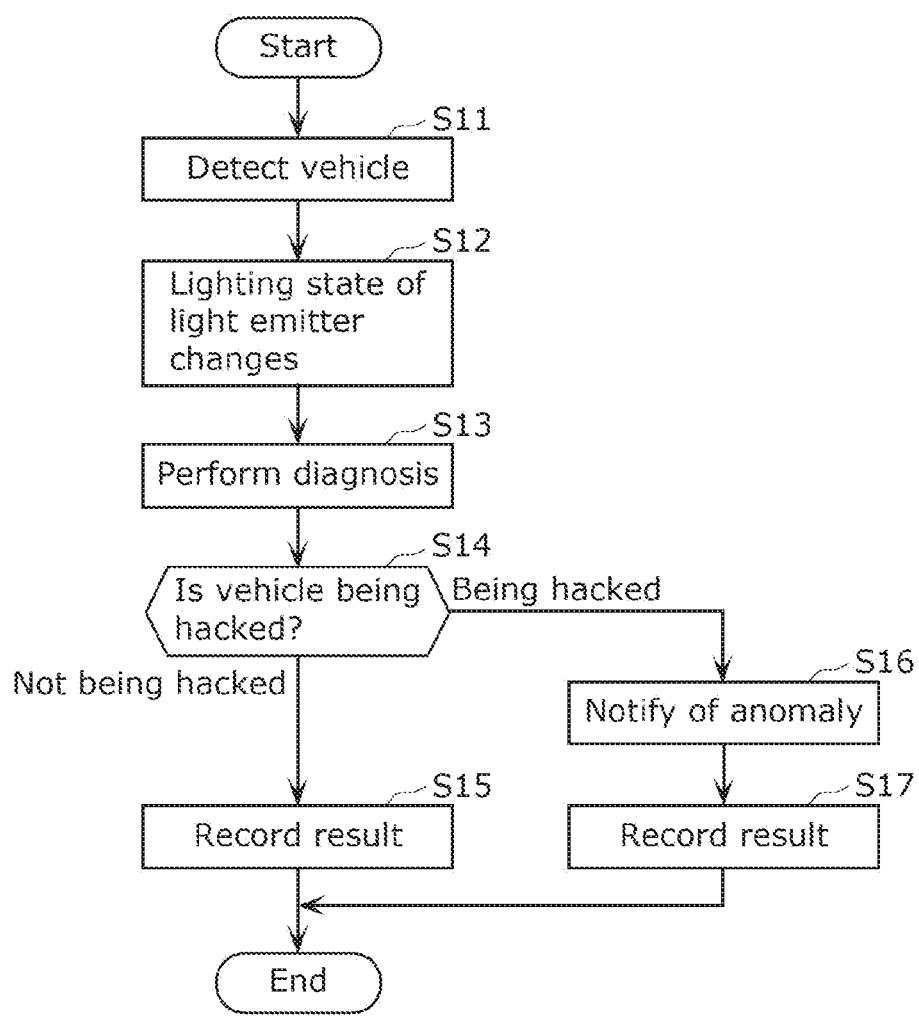
FIG. 7 is a flowchart illustrating an operation of the lighting device according to Embodiment 1.

FIG. 7 is a flowchart illustrating an operation of lighting device 10.

First, vehicle 50 is parked in parking space 91, and detector 13 of lighting device 10 detects vehicle 50 (Step S11).

In the present embodiment, when detector 13 detects vehicle 50, the lighting state of light emitter 12 changes (Step S12). Specifically, light emitter 12 changes from the off state to the on state.

When the lighting state of light emitter 12 changes, diagnostic unit 16 of lighting device 10 performs diagnosis of vehicle 50 (Step S13), and determines whether vehicle 50 is being hacked (Step S14). When it is determined that vehicle 50 is not being hacked, controller 15 records a diagnosis result that vehicle 50 is not being hacked in memory 15a (Step S15).

On the other hand, when it is determined that vehicle 50 is being hacked, controller 15 notifies of an anomaly (Step S16). For example, controller 15 notifies of an anomaly by making light emitter 12 emit illumination light to vehicle 50 or parking space 91. Controller 15 then records a diagnosis result that vehicle 50 is being hacked in memory 15a (Step S17). This is the end of the diagnosis of the presence of hacking of vehicle 50 by lighting device 10.

Here, three examples of the operation of diagnostic unit 16 performed in Step S13 will be described with reference to FIG. 8 to FIG. 11.

Figure 8:
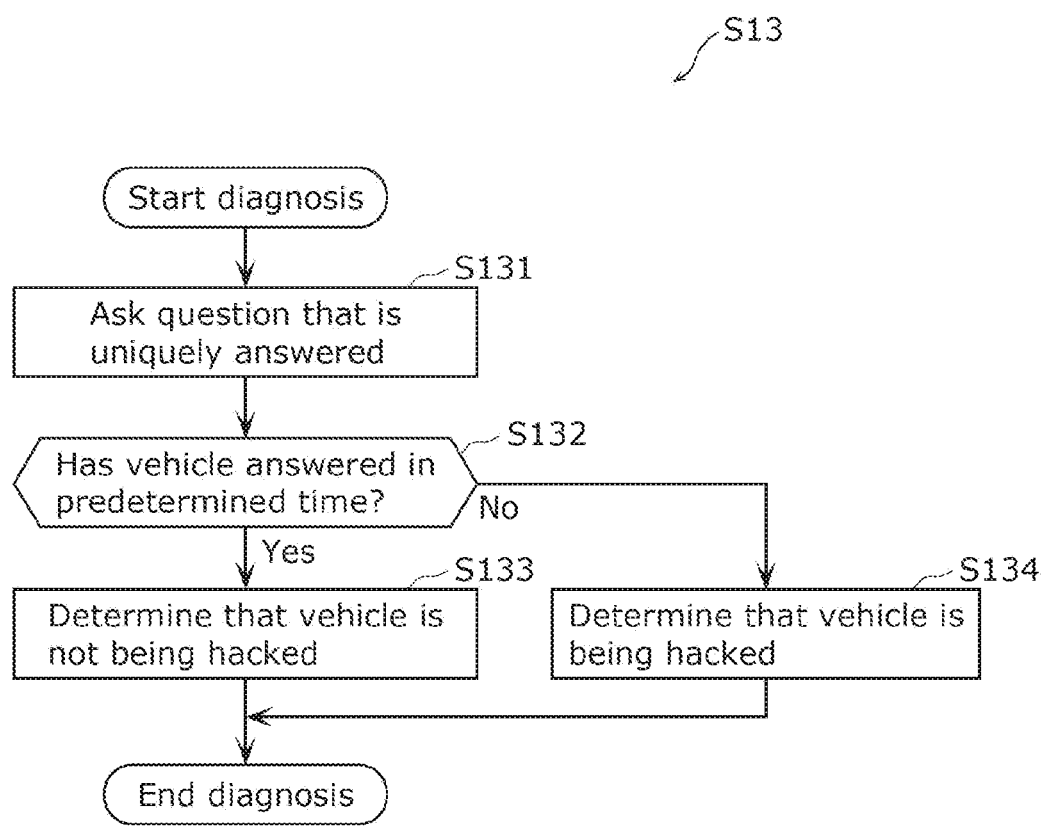
FIG. 8 is a flowchart illustrating an example of an operation of the diagnostic unit of the lighting device according to Embodiment 1.

FIG. 8 is a flowchart illustrating an example of the operation of diagnostic unit 16 of lighting device 10. FIG. 8 illustrates an example in which, among questions asked to vehicle 50, a question that is uniquely answered is asked.

First, diagnostic unit 16 asks vehicle 50 a plurality of questions that are uniquely answered (Step S131). These questions are randomly asked to vehicle 50 at different timings.

Diagnostic unit 16 then determines whether vehicle 50 has answered within a predetermined time (Step S132). When vehicle 50 has answered within the predetermined time (Yes in S132), diagnostic unit 16 determines that vehicle 50 is not being hacked (Step S133).

On the other hand, when vehicle 50 has not answered within the predetermined time (No in S132), diagnostic unit 16 determines that vehicle 50 is being hacked (Step S134). In this way, the presence of hacking of vehicle 50 can be diagnosed by asking a question that is uniquely answered.

Figure 9:
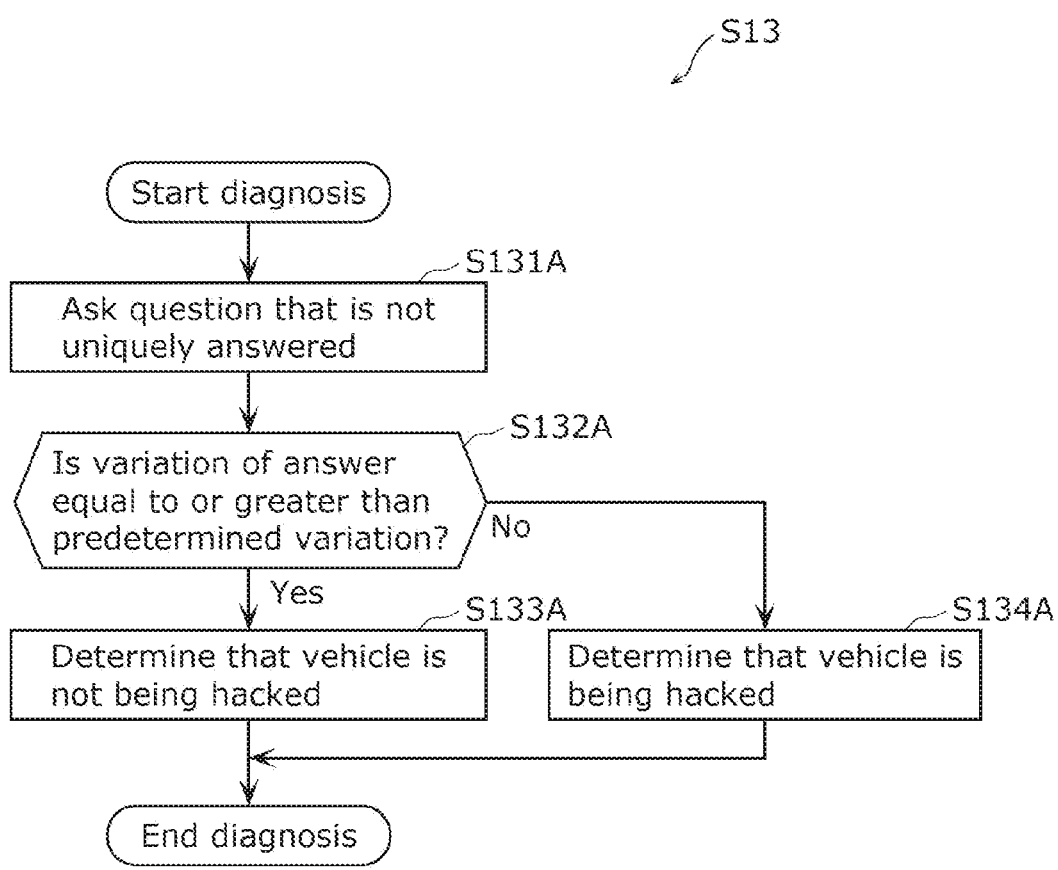
FIG. 9 is a flowchart illustrating another example of the operation of the diagnostic unit of the lighting device according to Embodiment 1.

FIG. 9 is a flowchart illustrating another example of the operation of diagnostic unit 16 of lighting device 10. FIG. 9 illustrates an example in which, of questions asked to vehicle 50, a question that is not uniquely answered is asked.

First, diagnostic unit 16 asks vehicle 50 a plurality of questions that are not uniquely answered (Step S131A). These questions are randomly asked to vehicle 50 at different timings.

Diagnostic unit 16 then determines whether or not the variation of the answers from vehicle 50 is greater than or equal to a predetermined variation (Step S132A). When the variation of the answers is greater than or equal to the predetermined variation (Yes in S132A), diagnostic unit 16 determines that vehicle 50 is not being hacked (Step S133A).

On the other hand, when the variation of the answers is smaller than the predetermined variation (No in S132A), diagnostic unit 16 determines that vehicle 50 is being hacked (Step S134A). In this way, the presence of hacking of vehicle 50 can be diagnosed by asking a question that is not uniquely answered.

Although questions that are uniquely answered and questions that are not uniquely answered have been separately described above, diagnostic unit 16 may diagnose the presence of hacking by asking the vehicle both questions that are uniquely answered and questions that are not uniquely answered in a random manner at different timings.

Figure 10:
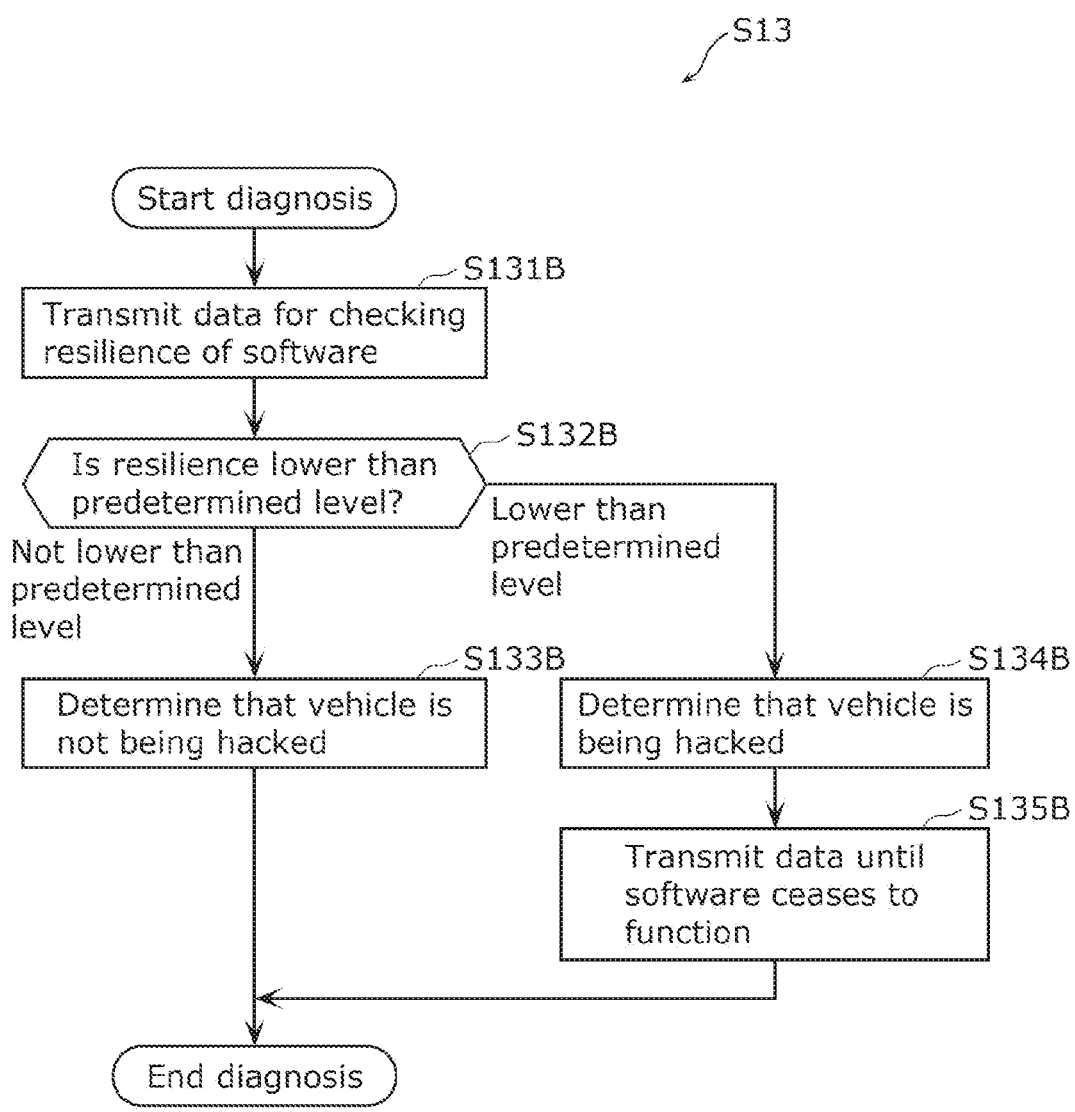
FIG. 10 is a flowchart illustrating another example of the operation of the diagnostic unit of the lighting device according to Embodiment 1.

FIG. 10 is a flowchart illustrating another example of the operation of diagnostic unit 16 of lighting device 10. FIG. 10 illustrates an example in which the resilience of software that runs a travel system provided in vehicle 50 is checked.

First, diagnostic unit 16 transmits, to vehicle 50, data for checking the resilience of software (Step S131B).

Diagnostic unit 16 then determines whether the resilience of the software is lower than a predetermined level (Step S132B). When the resilience of the software is not lower than the predetermined level, diagnostic unit 16 determines that vehicle 50 is not being hacked (Step S133B).

On the other hand, when the resilience of the software is lower than the predetermined level, diagnostic unit 16 determines that vehicle 50 is being hacked (Step S134B). Diagnostic unit 16 then continues a simulated attack until the software ceases to function (Step S135B), thereby taking the travel system provided in vehicle 50 down. In this way, the presence of hacking of vehicle 50 can be diagnosed by checking the resilience of software.

Figure 11:
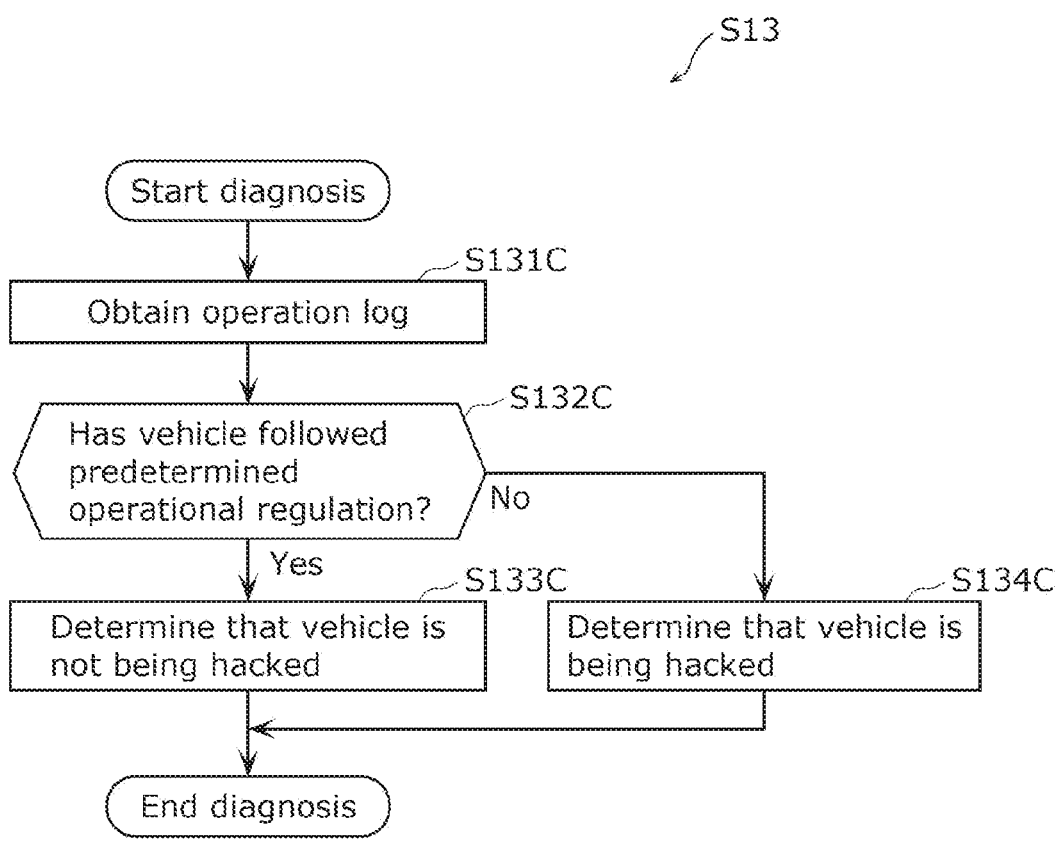
FIG. 11 is a flowchart illustrating another example of the operation of the diagnostic unit of the lighting device according to Embodiment 1.

FIG. 11 is a flowchart illustrating another example of the operation of diagnostic unit 16 of lighting device 10. FIG. 11 illustrates an example in which the presence of hacking of vehicle 50 is determined based on an operation log of vehicle 50.

First, diagnostic unit 16 obtains an operation log of vehicle 50 (Step S131C).

Diagnostic unit 16 then determines whether vehicle 50 has followed a predetermined operational regulation (Step S132C). When vehicle 50 has followed the predetermined operational regulation (Yes in S132C), diagnostic unit 16 determines that vehicle 50 is not being hacked (Step S133C).

On the other hand, when vehicle 50 has not followed the operational regulation (No in S132C), diagnostic unit 16 determines that vehicle 50 is being hacked (Step S134C). In this way, the presence of hacking of vehicle 50 can be determined based on an operation log.

As described above, lighting device 10 can diagnose the presence of hacking of vehicle 50 through the operations shown in FIG. 8 to FIG. 11. Therefore, damage due to the hacking of vehicle 50 can be reduced.

Embodiment 2

2-1. Configuration of Lighting Device

A configuration of lighting device 10A according to Embodiment 2 will be described with reference to FIG. 12 to FIG. 14. In Embodiment 2, an example will be described in which lighting device 10A is a portable lighting device.

Figure 12:
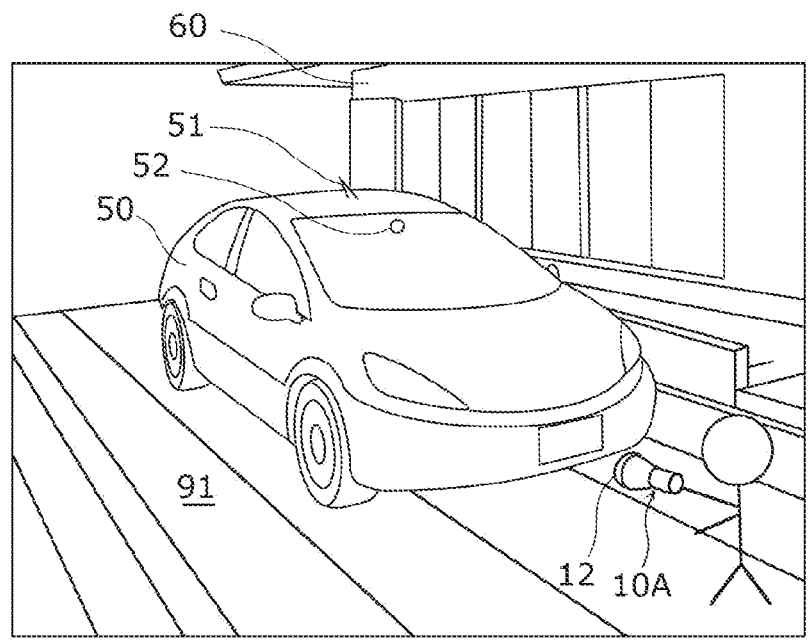
FIG. 12 is a diagram illustrating a use example of a lighting device according to Embodiment 2.
Figure 13:
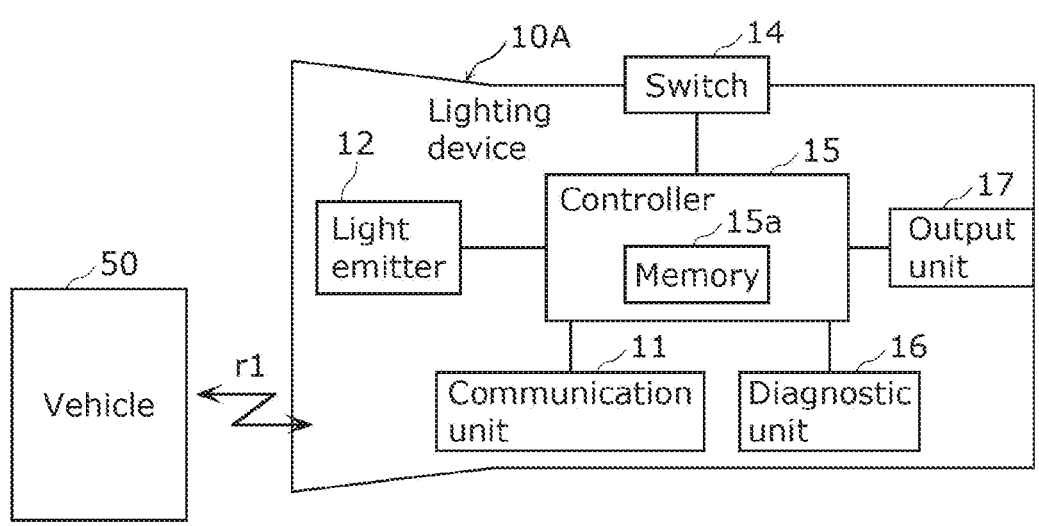
FIG. 13 is a block diagram illustrating a configuration of the lighting device according to Embodiment 2.

FIG. 12 is a diagram illustrating a use example of lighting device 10A according to Embodiment 2. FIG. 13 is a block diagram illustrating a configuration of lighting device 10A.

As shown in FIG. 12, lighting device 10A is a portable flashlight and has a cylindrical or truncated conical shape. As shown in FIG. 13, lighting device 10A includes communication unit 11 that communicates with vehicle 50, light emitter 12 that can emit illumination light, switch 14, diagnostic unit 16 that diagnoses vehicle 50 as to whether an autonomous driving program of vehicle 50 is being hacked, and output unit 17. Lighting device 10A further includes controller 15 that controls turning on and off, dimming, and toning of light emitter 12.

Light emitter 12 is a light source that emits illumination light, and is an LED light emitting module that emits light of red color, green color, or blue color, or synthetic light of these colors, for example. Light emitter 12 may be a combination of separate SMDs and COBs of RGB, incandescent bulb color, neutral white color, and other colors. Light emitter 12 is provided at an end of lighting device 10A in order to illuminate vehicle 50.

Switch 14 is an input unit for an input operation to turn on and off lighting device 10A. In the present embodiment, when switch 14 is turned on, light emitter 12 is turned on, and diagnostic unit 16 is enabled to diagnose vehicle 50 in response to the turning on of light emitter 12. When switch 14 is turned off, light emitter 12 is turned off, and diagnostic unit 16 ends the diagnosis of vehicle 50 in response to the turning off of light emitter 12.

Communication unit 11 is a communication module that communicates with vehicle 50 by radio r1. The communication scheme based on radio r1 has already been described above.

Output unit 17 is an output terminal for outputting a diagnosis result from diagnostic unit 16 to the outside, and is a universal serial bus (USB) terminal, for example.

Controller 15 is formed by a microprocessor, memory 15a, and a program stored in memory 15a, for example. Memory 15a stores identification information on vehicle 50, such as a license plate number. An operation log and a diagnosis result of vehicle 50 described later are also recorded in memory 15a. Controller 15 controls turning on and the like of light emitter 12, and controls operations of communication unit 11, diagnostic unit 16, and output unit 17.

When controller 15 receives an on operation for switch 14, for example, controller 15 transmits, to vehicle 50, a request signal that requests for the identification information on vehicle 50 via communication unit 11. Controller 15 issues a diagnosis command to diagnostic unit 16 to make diagnostic unit 16 diagnose vehicle 50, when the identification information on vehicle 50 transmitted from vehicle 50 agrees with identification information registered in advance. It should be noted that, instead of transmitting the request signal described above, controller 15 may establish a communication with vehicle 50, which is triggered by visible light communication from light emitter 12 to vehicle 50, and obtain the identification information on vehicle 50.

Diagnostic unit 16 is a circuit that diagnoses, via communication unit 11, whether vehicle 50 is being hacked. When the lighting state of light emitter 12 changes, for example, diagnostic unit 16 performs diagnosis of vehicle 50 parked in parking space 91. Specifically, diagnostic unit 16 performs diagnosis of the presence of hacking of vehicle 50 when light emitter 12 changes from an off state to an on state and diagnostic unit 16 has received a diagnosis command from controller 15.

The vehicle diagnosis by diagnostic unit 16 will be described with regard to three diagnosis examples.

A first diagnosis example is an example in which a vehicle diagnosis is performed based on an answer to a question asked to vehicle 50 by lighting device 10. Diagnostic unit 16 asks vehicle 50 a plurality of questions, and determines whether vehicle 50 is being hacked based on at least one of the answering time or the answer tendency to the questions.

A second diagnosis example is an example in which a vehicle diagnosis is performed by checking the resilience of software that runs a travel system provided in vehicle 50. Diagnostic unit 16 checks the resilience of the software in vehicle 50 via communication unit 11, and diagnoses that vehicle 50 is being hacked when the resilience level is lower than a predetermined level.

A third diagnosis example is an example in which an operation log of vehicle 50 is obtained, and a vehicle diagnosis is performed based on the operation log. Diagnostic unit 16 obtains an operation log of vehicle 50 via communication unit 11, and diagnoses that vehicle 50 is being hacked, when diagnostic unit 16 confirms that vehicle 50 is not following a predetermined operational regulation.

When diagnostic unit 16 has diagnosed that vehicle 50 is being hacked, controller 15 notifies that vehicle 50 is being hacked using illumination light from light emitter 12.

FIG. 14 is a diagram illustrating the lighting state of light emitter 12 of lighting device 10A.

As shown in FIG. 14, light emitter 12 is fully turned on when switch 14 is turned on and lighting device 10A starts diagnosis, and blinks while lighting device 10A is communicating with vehicle 50 and performing diagnosis. Light emitter 12 then emits light of blue color when the diagnosis result is that vehicle 50 is not being hacked, and emits light of red color when the diagnosis result is that vehicle 50 is being hacked.

In this way, a user of vehicle 50 can visually know whether vehicle 50 is being hacked. Therefore, the user can take measures to cope with the hacked vehicle 50, and reduce damage due to the hacking of vehicle 50.

2-2. Operation of Lighting Device

Next, an operation of lighting device 10A according to Embodiment 2 will be descried.

Figure 15:
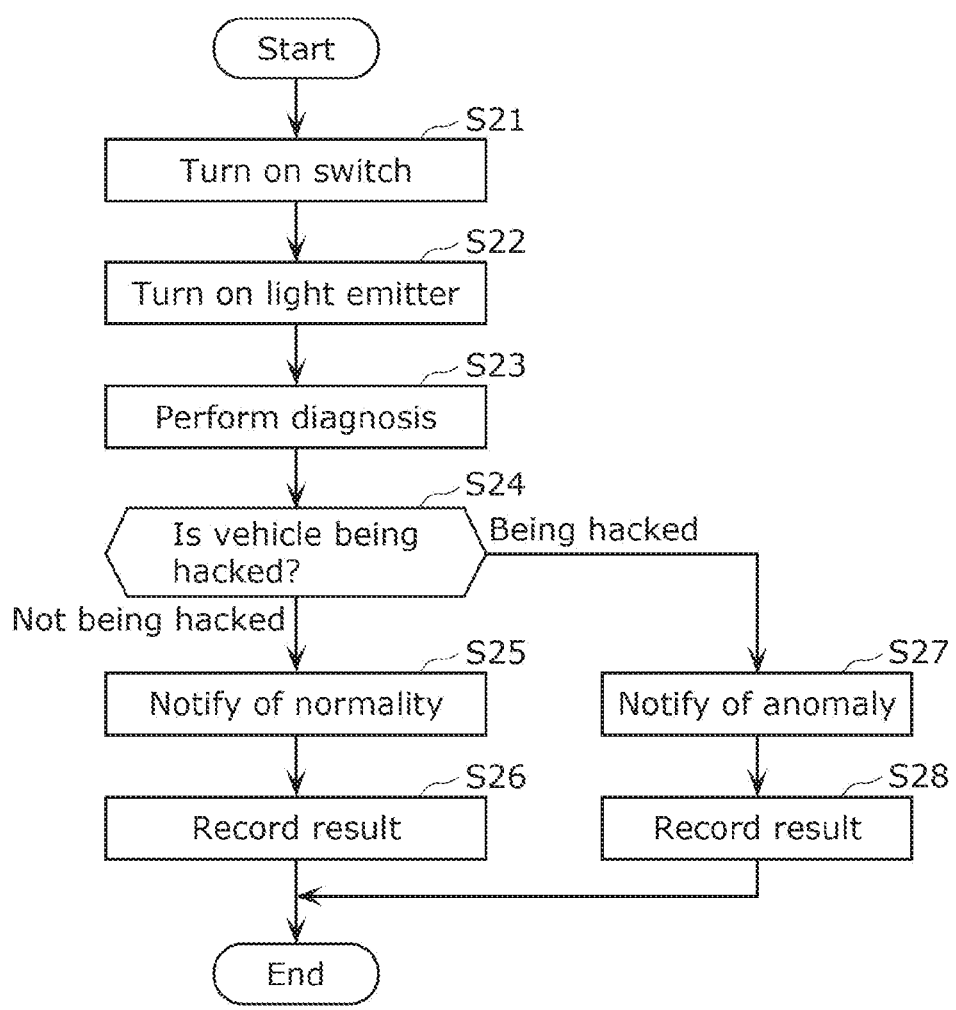
FIG. 15 is a flowchart illustrating an operation of the lighting device according to Embodiment 2.

FIG. 15 is a flowchart illustrating an operation of lighting device 10A.

First, lighting device 10A receives a turn-on operation of switch 14 by a user (Step S21). In response to this, light emitter 12 is turned on (Step S22).

Diagnostic unit 16 of lighting device 10A then performs diagnosis of vehicle 50 (Step S23), and determines whether vehicle 50 is being hacked (Step S24). When it is determined that vehicle 50 is not being hacked, controller 15 notifies of a normality through light emitter 12 (Step S25), and records a diagnosis result that vehicle 50 is not being hacked in memory 15a (Step S26).

On the other hand, when it is determined that vehicle 50 is being hacked, controller 15 notifies of an anomaly (Step S27), and records a diagnosis result that vehicle 50 is being hacked in memory 15a (Step S28). When lighting device 10A receives a turn-off operation of switch 14, lighting device 10A turns off light emitter 12, and ends the diagnosis of the presence of hacking of vehicle 50.

In this manner, lighting device 10A can diagnose the presence of hacking of vehicle 50 through the operations indicated in steps S21 to S28. Therefore, damage due to the hacking of vehicle 50 can be reduced.

Embodiment 3

3-1. Configuration of Lighting System

A configuration of lighting system 1 according to Embodiment 3 will be described with reference to FIG. 16 and FIG. 17. In Embodiment 3, an example will be described in which lighting device having a vehicle diagnostic function forms a part of an Internet-of-things (IoT) system.

Figure 16:
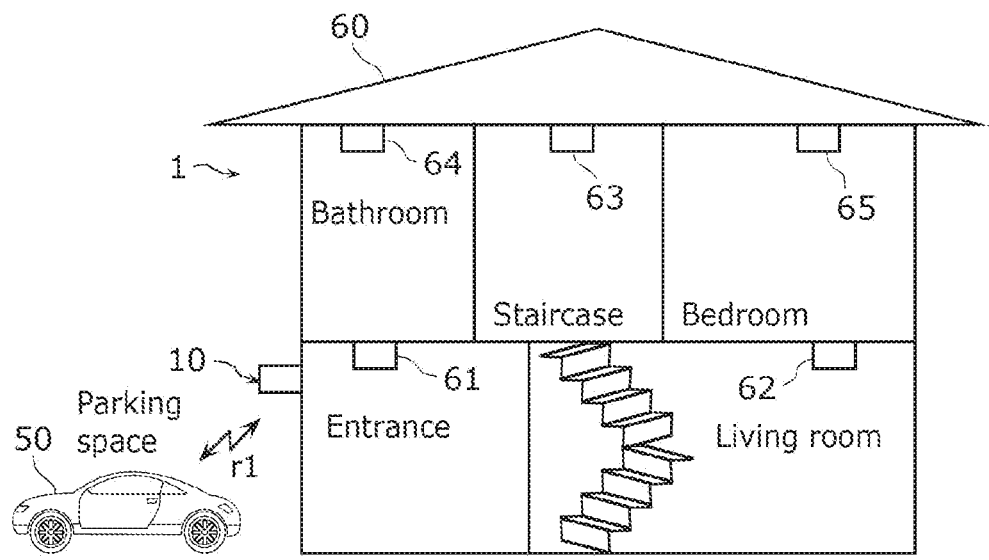
FIG. 16 is a schematic diagram illustrating a lighting system according to Embodiment 3.

FIG. 16 is a schematic diagram illustrating lighting system 1 according to Embodiment 3.

As shown in FIG. 16, lighting system 1 is formed by a plurality of lighting apparatuses. Lighting device 10, which has a vehicle diagnostic function among the plurality of lighting apparatuses, is installed on an exterior wall of building 60 in order to emit illumination light onto vehicle 50 in parking space 91. Of the plurality of lighting apparatuses, entrance light 61, living-room light 62, staircase light 63, bathroom light 64, and bedroom light 65 are installed in an entrance, a living room, a staircase, a bathroom, and a bedroom of building 60, respectively. Each of these lighting apparatuses has a radio communication function.

Figure 17:
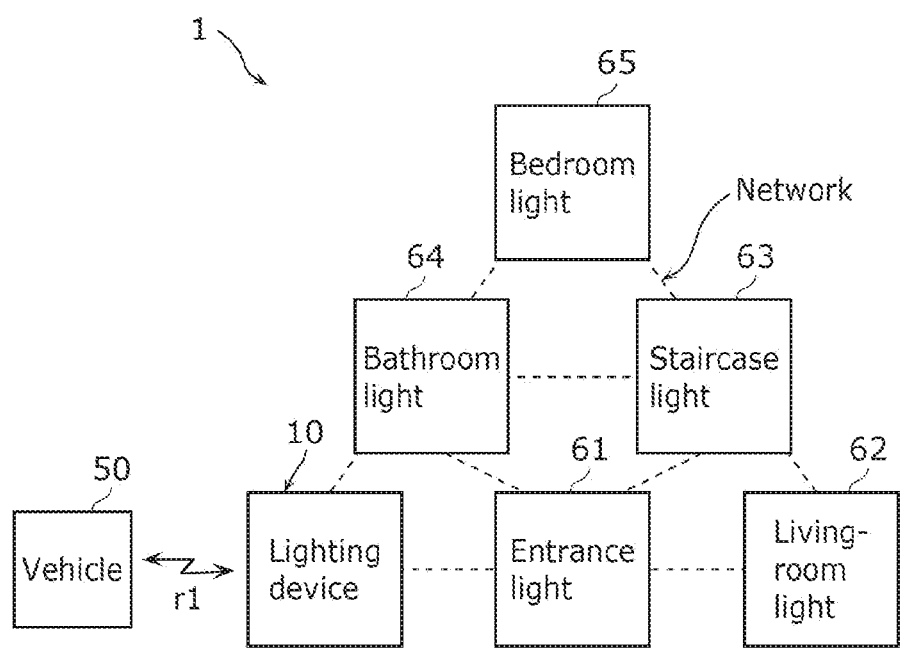
FIG. 17 is a diagram illustrating a communication connection relationship between lighting apparatuses included in the lighting system according to Embodiment 3.

FIG. 17 is a diagram illustrating a communication connection relationship between the plurality of lighting apparatuses forming lighting system 1.

As shown in FIG. 17, lighting device 10, entrance light 61, living-room light 62, staircase light 63, bathroom light 64, and bedroom light 65 form a mesh network and can communicate with each other. Examples of the mesh network referred to herein include a Bluetooth® low energy (BLE) ad hoc network.

With lighting system 1 according to the present embodiment, diagnostic unit 16 of lighting device 10 starts or ends diagnosis in response to the lighting state of another lighting apparatus provided in building 60. In the following, an operation of lighting system 1 having the configuration described above will be described.

3-2. Operation of Lighting System

An operation of lighting system 1 according to Embodiment 3 will be described with reference to FIG. 18 and FIG. 19.

FIG. 18 is a flowchart illustrating an example of an operation of lighting system 1.

First, when the owner of vehicle 50 gets home, lighting device 10 and entrance light 61 are turned on in response to the owner's getting home (Step S31). The owner then enters the house, and turns on a light in the house (Step S32).

For example, at 24 o'clock (0 o'clock), which is the owner's bedtime, the owner enters the bedroom and turns off bedroom light 65 (Step S33). When going to bed, living-room light 62, staircase light 63, and bedroom light 65 of the plurality of lighting apparatuses included in lighting system 1 are turned off in the listed order, that is, in order of increasing proximity to the bedroom, and therefore, lighting system 1 can recognize that the owner is going to bed. That is, when lighting apparatuses are turned off in sequence in order of increasing proximity to the bedroom, the owner is going to bed, and vehicle 50 will not be used for a long time. Thus, lighting system 1 uses this time to perform a vehicle diagnosis (Step S34).

At 6:00, which is the owner's wake-up time, the owner turns on bedroom light 65 (Step S35). The turning on of bedroom light 65 notifies lighting system 1 that the owner will use vehicle 50 to go to work in several tens of minutes. Thus, lighting system 1 ends the vehicle diagnosis when bedroom light 65 is turned on around the wake-up time (Step S36). When ending the vehicle diagnosis, lighting system 1 records the diagnosis result in memory 15a of lighting device 10.

With lighting system 1, the presence of hacking of vehicle 50 can be diagnosed by taking advantage of turning on or off of a lighting apparatus or other events in daily life. In this way, damage due to the hacking of vehicle 50 can be reduced.

FIG. 19 is a flowchart illustrating another example of the operation of lighting system 1. Steps S31 to S34 are the same as those in FIG. 18, and descriptions thereof will be omitted.

Referring to FIG. 19, a case will be described where at 2:00 at night, the owner needs to go out for some reason. The owner gets up late at night, and turns on lighting apparatuses in the house, such as bedroom light 65 (Step S35A). For example, when the owner goes to work, the owner turns on bedroom light 65, living-room light 62, and entrance light 61 among the lighting apparatuses in the listed order while the owner goes to parking space 91. Since bedroom light 65, living-room light 62, and entrance light 61 are turned on in the listed order, lighting system 1 can recognize that the owner will use vehicle 50 to go out soon. Therefore, when the lighting apparatuses are turned on in order of increasing proximity to the entrance, lighting system 1 ends the vehicle diagnosis even though late at night (Step S36A). When ending the vehicle diagnosis, if the vehicle diagnosis is still in process, lighting system 1 records the partial diagnosis result in memory 15a. In this way, a load on the system and an adverse effect on the system due to the forced termination of the vehicle diagnosis can be prevented.

With lighting system 1, the presence of hacking of vehicle 50 can be diagnosed by taking advantage of turning on or off of a lighting apparatus or other events in daily life. In this way, damage due to the hacking of vehicle 50 can be reduced.

Although an example has been shown above in which a plurality of lighting apparatuses forms an IoT system, the present disclosure is not limited to this, and a smartphone, a smart speaker, or an alarm clock may be linked with the IoT system. In that case, lighting system 1 may determine the start time and the end time of the vehicle diagnosis based on a schedule recorded in the smartphone, words or actions detected by the smart speaker, or the wake-up time set in the alarm clock, for example.

3-3. Variation 1 of Embodiment 3

Next, a configuration of lighting system 1A according to Variation 1 of Embodiment 3 will be described with reference to FIG. 20 and FIG. 21. In Variation 1 of Embodiment 3, again, an example will be described in which lighting device 10 having a vehicle diagnostic function forms a part of an IoT system.

Figure 20:
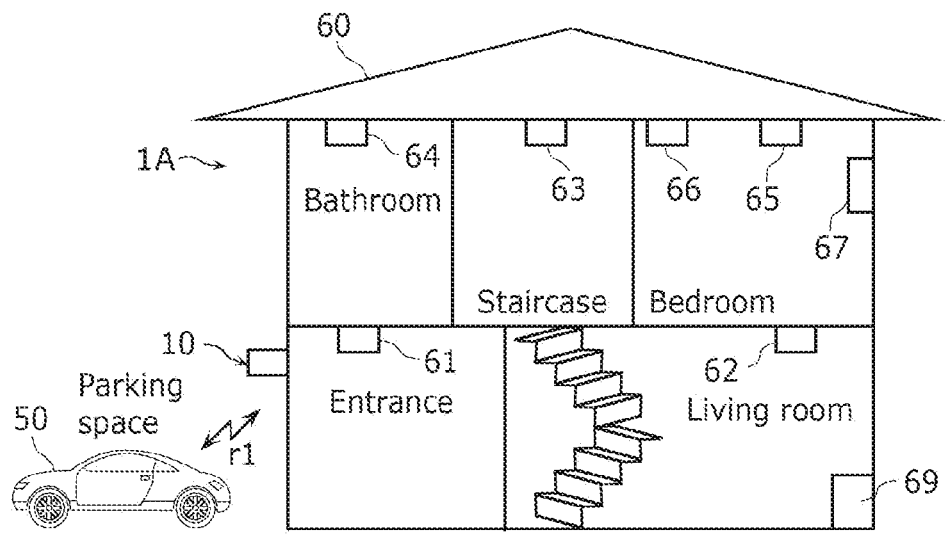
FIG. 20 is a schematic diagram illustrating a lighting system according to Variation 1 of Embodiment 3.

FIG. 20 is a schematic diagram illustrating lighting system 1A according to Variation 1 of Embodiment 3.

As shown in FIG. 20, lighting system 1A is formed by a plurality of electrical apparatuses. Lighting device 10, which has a vehicle diagnostic function among the plurality of lighting apparatuses, is installed on an exterior wall of building 60 in order to emit illumination light onto vehicle 50 in parking space 91. Of the plurality of electrical apparatuses, entrance light 61, living-room light 62, staircase light 63, bathroom light 64, and bedroom light 65 are installed in an entrance, a living room, a staircase, a bathroom, and a bedroom of building 60, respectively. In this variation, in building 60, motion sensor 66 and bedroom switch 67 are installed in the bedroom, and lighting controller 69 is installed in the living room.

Figure 21:
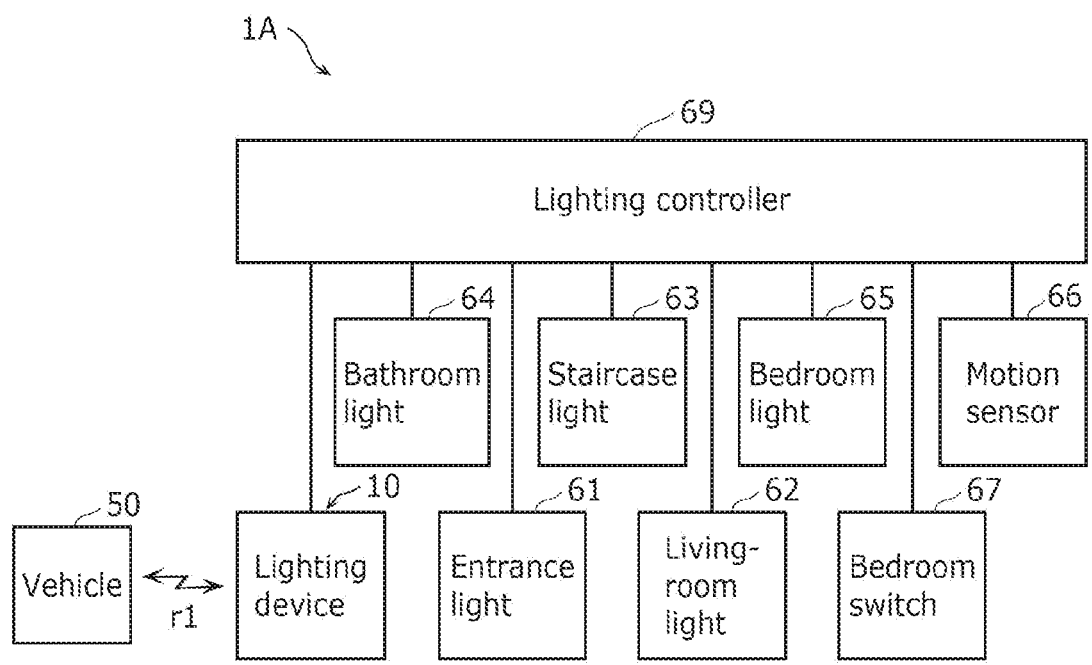
FIG. 21 is a diagram illustrating a communication connection relationship between electrical apparatuses included in the lighting system according to Variation 1 of Embodiment 3.

FIG. 21 is a diagram illustrating a communication connection relationship between the plurality of electrical apparatuses forming lighting system 1A.

As shown in FIG. 21, entrance light 61, living-room light 62, staircase light 63, bathroom light 64, bedroom light 65, motion sensor 66, and bedroom switch 67 are each communicatively connected to lighting controller 69 via a network. Operations of electrical apparatuses including the plurality of lighting apparatuses, motion sensor 66, and bedroom switch 67 are each controlled by lighting controller 69.

For example, when motion sensor 66 in the bedroom detects a person, and bedroom switch 67 is turned off, lighting controller 69 turns off bedroom light 65, and diagnosis of vehicle 50 is started by lighting device 10. Lighting system 1A according to the variation performs diagnosis of vehicle 50 when the operational state of at least one of the electrical apparatuses changes. Specifically, diagnostic unit 16 of lighting device 10 starts or ends diagnosis in response to the lighting state or operational state of another electrical apparatus provided in building 60. In this variation, again, the presence of hacking of vehicle 50 is being hacked can be diagnosed by taking advantage of turning on or off of a lighting apparatus or other events in daily life. In this way, damage due to the hacking of vehicle 50 can be reduced.

3-4. Variation 2 of Embodiment 3

Next, a configuration of lighting system 18 according to Variation 2 of Embodiment 3 will be described with reference to FIG. 22 and FIG. 23. In Variation 2 of Embodiment 3, an example will be described in which vehicle diagnostic device 30B of lighting system performs diagnosis of vehicle 50 in a state where the communication with the apparatuses other than vehicle 50 is disconnected.

Figure 22:
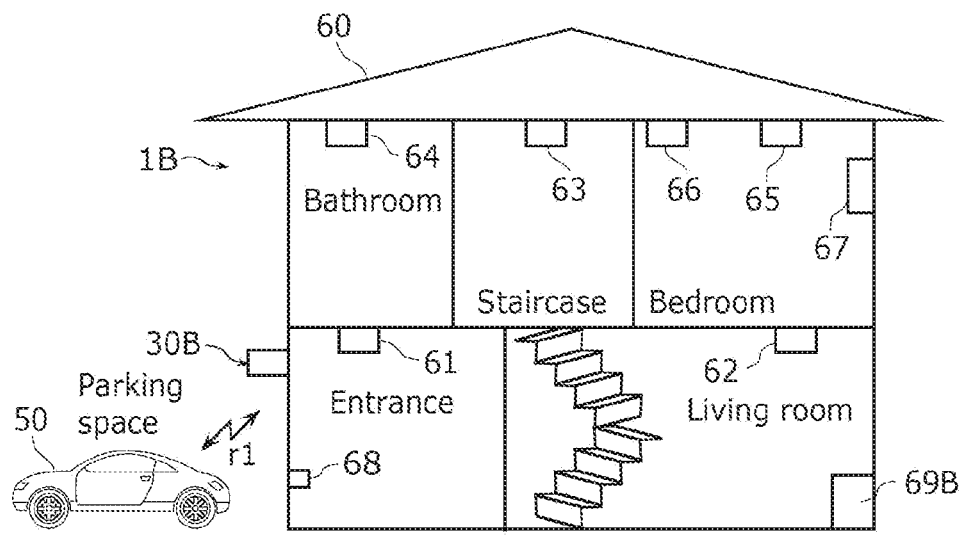
FIG. 22 is a schematic diagram illustrating a lighting system according to Variation 2 of Embodiment 3.

FIG. 22 is a schematic diagram illustrating lighting system 18 according to Variation 2 of Embodiment 3.

As shown in FIG. 22, lighting system 18 is formed by a plurality of electrical apparatuses, controller 69B, and vehicle diagnostic device 30B. Vehicle diagnostic device 30B is installed on an exterior wall of building 60. Of the plurality of electrical apparatuses, entrance light 61, living-room light 62, staircase light 63, bathroom light 64, and bedroom light 65 are installed in an entrance, a living room, a staircase, a bathroom, and a bedroom of building 60, respectively. Motion sensor 66 and bedroom switch 67 are installed in the bedroom, door switch 68 is installed on the door of the entrance, and controller 69B is installed in the living room.

Figure 23:
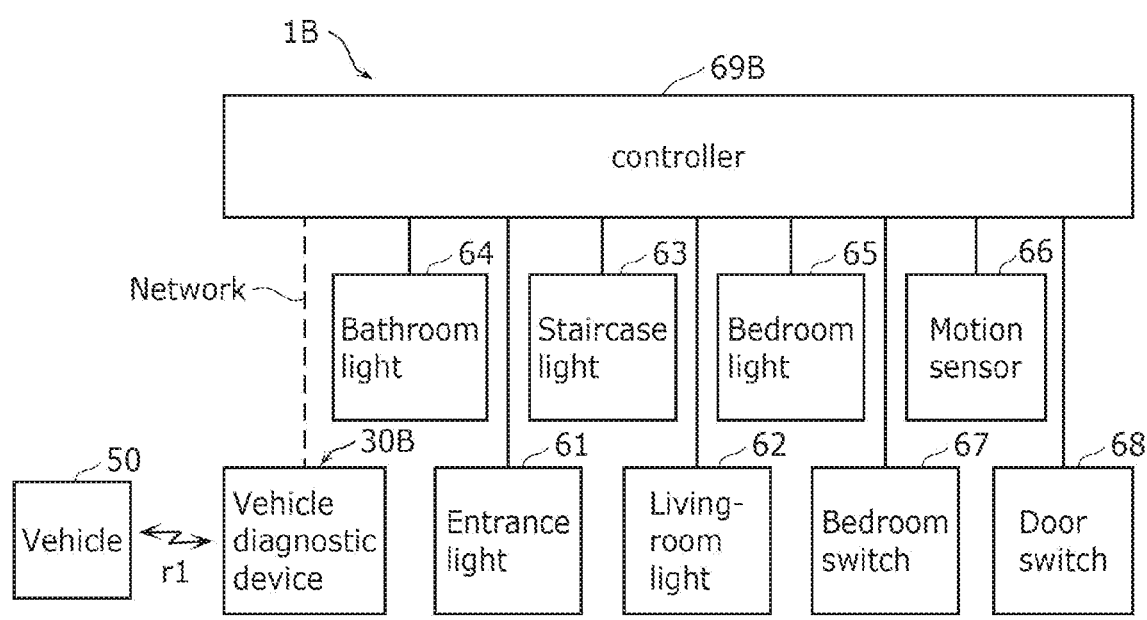
FIG. 23 is a diagram illustrating a communication connection relationship between electrical apparatuses, a controller, and a vehicle diagnostic device included in the lighting system according to Variation 2 of Embodiment 3.
Figure 24:
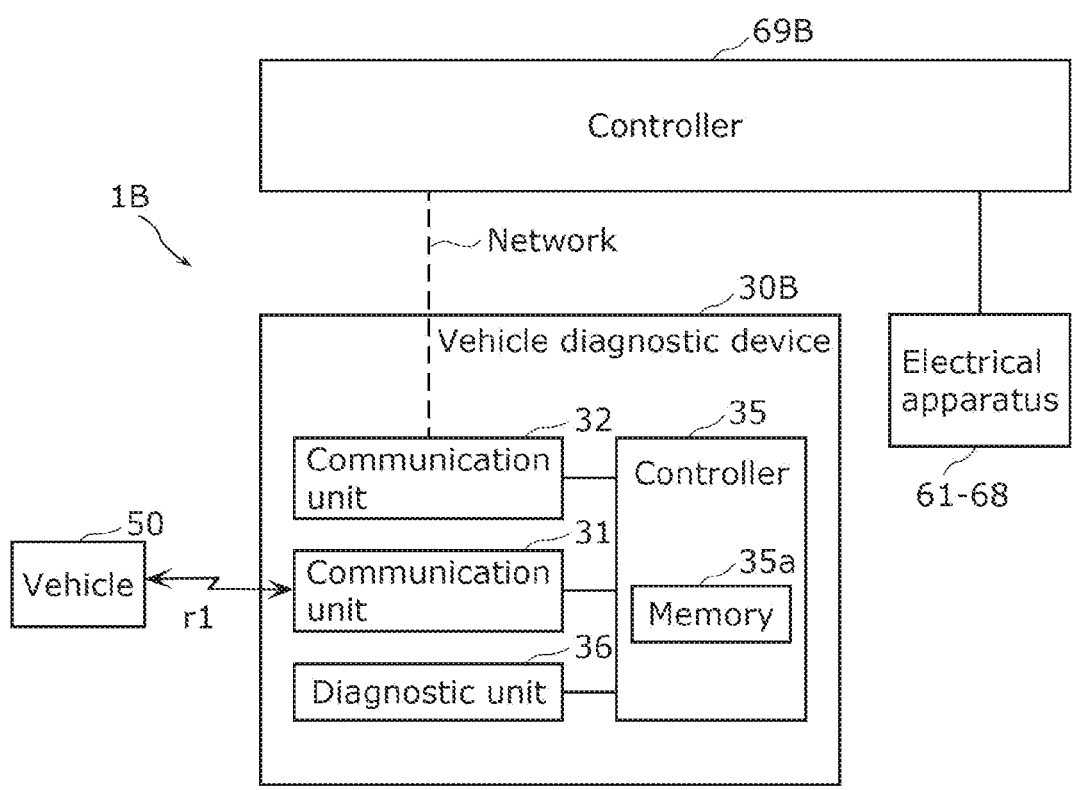
FIG. 24 is a block diagram illustrating a part of the configuration of the lighting system according to Variation 2 of Embodiment 3.

FIG. 23 is a diagram illustrating a communication connection relationship between the plurality of electrical apparatuses, controller 69B, and vehicle diagnostic device 30B forming lighting system 18. FIG. 24 is a block diagram illustrating a part of the configuration of lighting system 18.

As shown in FIG. 23, vehicle diagnostic device 30B, entrance light 61, living-room light 62, staircase light 63, bathroom light 64, bedroom light 65, motion sensor 66, door switch 68, and bedroom switch 67 are each communicatively connected to controller 69B.

As shown in FIG. 24, vehicle diagnostic device 30B includes communication unit 31 that communicates with vehicle 50, another communication unit 32 that communicates with a plurality of electrical apparatuses via a network, diagnostic unit 36 that diagnoses vehicle 50 as to whether an autonomous driving program of vehicle 50 is being hacked, and controller 35 that controls operations of communication unit 31, communication unit 32, and diagnostic unit 36.

Controller 35 of vehicle diagnostic device 30B controls diagnostic unit 36 to perform diagnosis of vehicle 50 when the operational state of at least one of the plurality of electrical apparatuses changes. For example, "when the operational state of an electrical apparatus changes" means when the lighting state of a lighting apparatus, which is an electrical apparatus, changes, when motion sensor 66, which is an electrical apparatus, detects the owner, when bedroom switch 67, which is an electrical apparatus, is turned off, or when door switch 68, which is an electrical apparatus, is turned on.

When diagnostic unit 36 perform the diagnosis described above via communication unit 31, vehicle diagnostic device 30B according to Variation 2 limits the communication with the plurality of electrical apparatuses via the network and communication unit 32 to only a predetermined communication, such as identification (ID) authentication, and controls diagnostic unit 36 to perform the diagnosis in this state. After the diagnosis ends, vehicle diagnostic device 30B returns the communication with the plurality of electrical apparatuses to the original communication state through communication unit 32. In this way, by limiting the communication with the plurality of electrical apparatuses to only a predetermined communication when performing diagnosis of hacking of vehicle 50, the hacked vehicle 50 can be prevented from adversely affecting the plurality of electrical apparatuses, for example.

Although an example has been shown above in which, in lighting system 18 according to Variation 2, vehicle diagnostic device 30B performs diagnosis of vehicle 50 while limiting the communication with a plurality of electrical apparatuses to only a predetermined communication, the present disclosure is not limited to this. For example, vehicle diagnostic device 30B may limit the communication with a plurality of electrical apparatuses to only a predetermined communication, then download an operation log of vehicle 50 by communicating with vehicle 50, and then diagnose vehicle 50 based on the operation log in the state where the communication with vehicle 50 is limited to only a predetermined communication.

Embodiment 4

A configuration of lighting system 1C according to Embodiment 4 will be described with reference to FIG. 25 and FIG. 26. In Embodiment 4, an example will be described in which lighting system 1C is formed by lighting device 10C and vehicle diagnostic device 30C.

Figure 25:
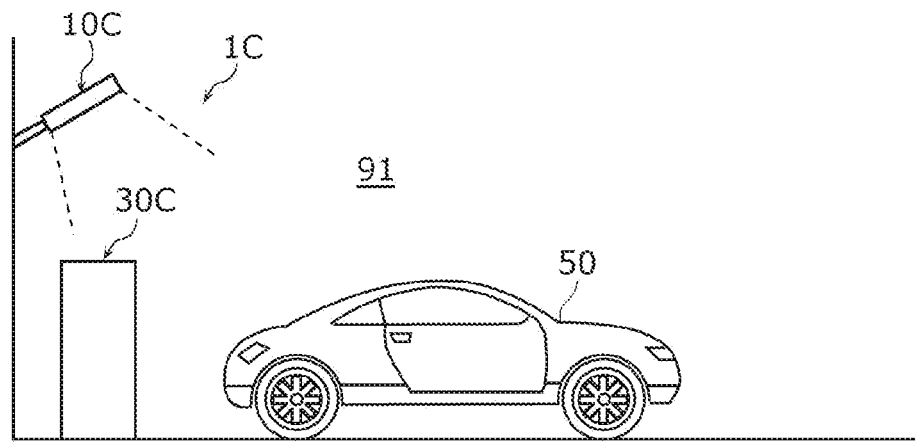
FIG. 25 is a schematic diagram illustrating a lighting system according to Embodiment 4.

FIG. 25 is a schematic diagram illustrating lighting system 1C according to Embodiment 4.

Lighting device 10C and vehicle diagnostic device 30C of lighting system 1C are installed in parking space 91 in which vehicle 50 is parked. Although lighting device 10C is installed on a wall of parking space 91 in FIG. 25, the present disclosure is not limited to this, and lighting device 10C may be installed on a ceiling, a pillar or the like of parking space 91.

Figure 26:
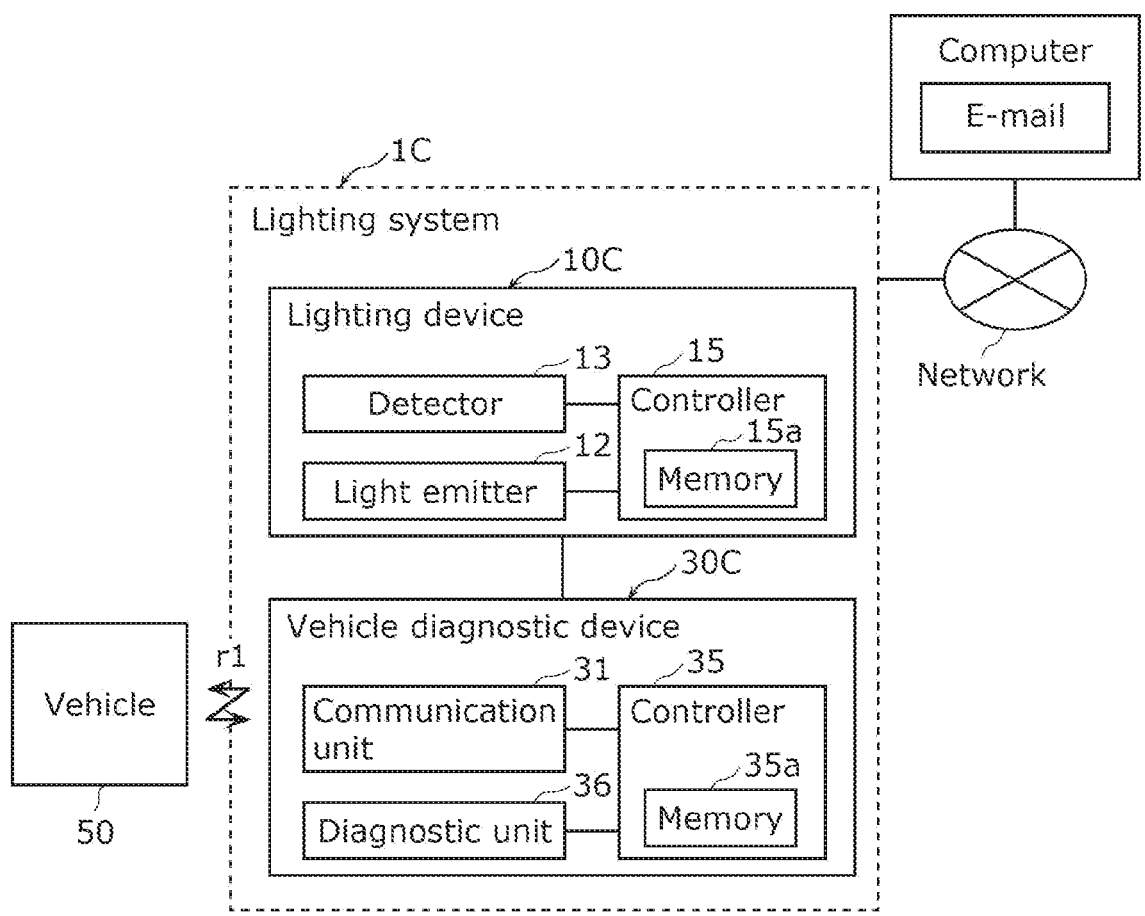
FIG. 26 is a block diagram illustrating a configuration of the lighting system according to Embodiment 4.

FIG. 26 is a block diagram illustrating a configuration of lighting system 1C. FIG. 26 also illustrates a computer communicatively connected to lighting system 1C via a network.

As shown in FIG. 26, lighting system 1C is formed by lighting device 10C and vehicle diagnostic device 30C. Lighting device 10C includes light emitter 12 that can emit illumination light, detector 13 that detects vehicle 50, and controller 15 that controls operations of light emitter 12 and detector 13. Vehicle diagnostic device 30C includes communication unit 31 that communicates with vehicle 50, diagnostic unit 36 that diagnoses vehicle 50 as to whether an autonomous driving program of vehicle 50 is being hacked, and controller 35 that controls operations of communication unit 31 and diagnostic unit 36.

Light emitter 12 of lighting device 10C is a light source that emits illumination light, and is a liquid crystal projector that projects a static image or moving image, or an LED light emitting module that emits light of red color, green color, or blue color, or synthetic light of these colors, for example. Light emitter 12 may be a combination of separate SMDs and COBs of RGB, incandescent bulb color, neutral white color, and other colors. Light emitter 12 is provided at a position higher than the height of vehicle 50, in order to illuminate vehicle 50 and surroundings of vehicle 50.

Detector 13 of lighting device 10C is a sensor that detects the presence or absence of vehicle 50 in parking space 91, such as an image sensor, an infrared sensor, or a laser sensor. Detector 13 is constantly operating, and detects whether vehicle 50 is parked in parking space 91. In the present embodiment, light emitter 12 is turned on in response to detector 13 detecting vehicle 50, and vehicle diagnostic device 30C is enabled to diagnose vehicle 50 in response to turning on of light emitter 12.

Communication unit 31 of vehicle diagnostic device 30C is a communication module that communicates with vehicle 50 by radio r1. The communication scheme based on radio r1 has already been described above.

Controller 35 of vehicle diagnostic device 30C is formed by a microprocessor, memory 35a, and a program stored in memory 35a, for example. Memory 35a stores identification information on vehicle 50, such as a license plate number. An operation log and a diagnosis result of vehicle 50 described later are also recorded in memory 35a.

When detector 13 detects vehicle 50, and controller 35 obtains the detection information from lighting device 10C, for example, controller 35 transmits, to vehicle 50, a request signal that requests for the identification information on vehicle 50 via communication unit 31. Controller 35 issues a diagnosis command to diagnostic unit 36 to make diagnostic unit 36 diagnose vehicle 50, when the identification information on vehicle 50 transmitted from vehicle 50 agrees with identification information registered in advance.

Instead of transmitting the request signal described above, controller 35 may establish a communication with vehicle 50, which is triggered by visible light communication from light emitter 12 to vehicle 50, and obtain the identification information on vehicle 50. Alternatively, controller 35 may obtain the identification information on vehicle 50 by imaging the license plate by means of detector 13. Instead of using detector 13, controller 35 may obtain the identification information on vehicle 50 by requesting for transmission of the identification information from vehicle 50 by regularly transmitting a beacon signal from communication unit 31. That is, controller 35 may detect vehicle 50 by means of communication unit 31 and then perform diagnosis via communication unit 31.

Diagnostic unit 36 is a circuit that diagnoses, via communication unit 31, whether vehicle 50 is being hacked. When the lighting state of light emitter 12 changes, for example, diagnostic unit 36 perform diagnosis of vehicle 50 parked in parking space 91. Specifically, diagnostic unit 36 performs diagnosis of the presence of hacking of vehicle 50 when light emitter 12 changes from the off state to the on state and diagnostic unit 36 has received a diagnosis command from controller 35.

Diagnostic unit 36 may perform the diagnosis not only when light emitter 12 changes from the off state to the on state but also when light emitter 12 changes from the on state to the off state or the dimmed state or when the lighting color changes. Furthermore, diagnostic unit 36 may end the diagnosis of the presence of hacking of vehicle 50 when the lighting state changes again after light emitter 12 changes from the on state to the off state or the dimmed state or after the lighting color changes.

There are three examples of the vehicle diagnosis by diagnostic unit 36.

A first diagnosis example is an example in which a vehicle diagnosis is performed based on an answer to a question asked to vehicle 50 by vehicle diagnostic device 30C. Diagnostic unit 36 asks vehicle 50 a plurality of questions, and determines whether vehicle 50 is being hacked based on at least one of the answering time or the answer tendency to the questions.

A second diagnosis example is an example in which a vehicle diagnosis is performed by checking the resilience of software that runs a travel system provided in vehicle 50. Diagnostic unit 36 checks the resilience of the software in vehicle 50 via communication unit 31, and diagnoses that vehicle 50 is being hacked when the resilience level is lower than a predetermined level.

A third diagnosis example is an example in which an operation log of vehicle 50 is obtained, and a vehicle diagnosis is performed based on the operation log. Diagnostic unit 36 obtains the operation log of vehicle 50 via communication unit 31, and diagnoses that vehicle 50 has been hacked when vehicle 50 is not following a predetermined operational regulation.

When diagnostic unit 36 has diagnosed that vehicle 50 is being hacked, controller 35 notifies that vehicle 50 is being hacked using illumination light from light emitter 12. For example, when light emitter 12 is a liquid crystal projector, controller 35 notifies information regarding hacking by illuminating vehicle 50 or parking space 91 with a static image or moving image projected by light emitter 12.

In this way, the user of vehicle 50 can know whether vehicle 50 is being hacked. Therefore, the user can take measures to cope with the hacked vehicle 50, and reduce damage due to the hacking of vehicle 50.

In another example of the notification of the diagnosis result, lighting system 1C may notify a computer communicatively connected to lighting system 1C via a network of the diagnosis result (see FIG. 26). For example, lighting system 1C may transmit the diagnosis result to a management server that is a computer owned by a dealer of vehicle 50. Lighting system 1C may also notify of the diagnosis result by transmitting an e-mail to an e-mail address registered by the owner or dealer in advance. This allows the owner or dealer to take measures to cope with the hacked vehicle 50 and reduce damage due to the hacking of vehicle 50.

Embodiment 5

[5-1. Configuration of Lighting System]

A configuration of lighting system 1D according to Embodiment 5 will be described with reference to FIG. 27 to FIG. 29. In Embodiment 5, an example will be described in which lighting device 10D diagnoses vehicle 50 parked in parking space 91 that is a public parking space.

Figure 27:
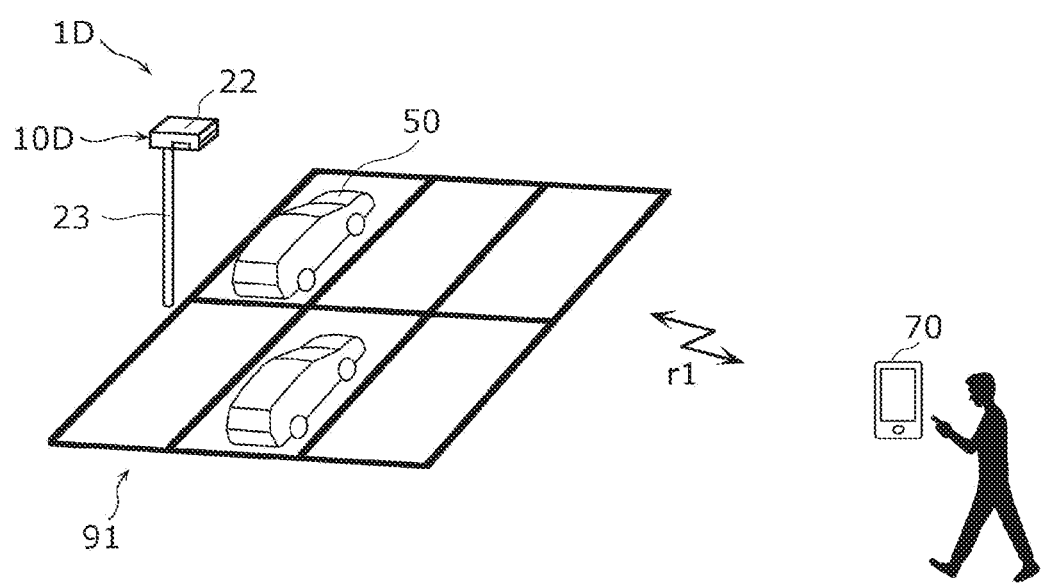
FIG. 27 is a schematic diagram illustrating a lighting system according to Embodiment 5.

FIG. 27 is a schematic diagram illustrating lighting system 1D according to Embodiment 5.

As shown in FIG. 27, lighting system 1D includes lighting device 10D provided at a side of parking space 91, and information terminal 70 that communicates with lighting device 10D. Information terminal 70 is a portable terminal held by the owner of vehicle 50. Although FIG. 27 illustrates one lighting device 10D, lighting system 1D may include a plurality of lighting devices 10D.

Lighting device 10D is a device that emits illumination light to parking space 91, and is, for example, an outdoor lighting device such as a street light, a security light, or the like. Lighting device 10D may be installed in a parking space of a park, the premises of an apartment building, or the premises of a factory, for example.

Lighting device 10D includes pole body 23 installed at a side of parking space 91, and lamp 22 provided on pole body 23. Pole body 23 is a columnar member, and is a utility pole on which a distribution line is provided, a pole of a street light, or a pole to which a security camera is attached, for example. Pole body 23 may have an L-shape or T-shape.

Figure 28:
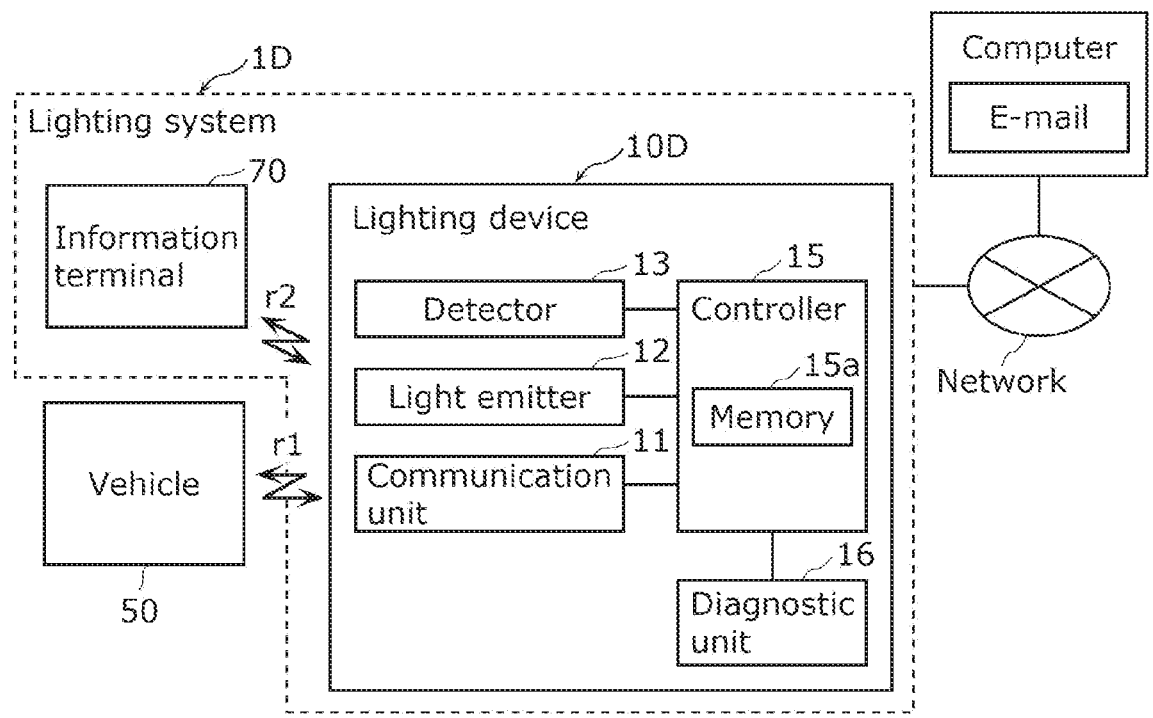
FIG. 28 is a block diagram illustrating a configuration of the lighting system according to Embodiment 5.

FIG. 28 is a block diagram illustrating a configuration of lighting system 1D. FIG. 29 is a schematic diagram illustrating lighting device 10D of lighting system 1D. FIG. 28 also illustrates a computer communicatively connected to lighting system 1D via a network.

As shown in FIG. 28, lighting device 10D includes communication unit 11, light emitter 12, detector 13, controller 15, and diagnostic unit 16.

Communication unit 11 is a communication module that communicates with vehicle 50 by radio r1, and communicates with information terminal 70 by radio r2. The communication scheme based on radio r2 may be Bluetooth®, Zigbee®, or WiFi®, for example. Communication unit 11 may be capable of communicating with information terminal 70 via a network (not shown), such as the Internet. Communication unit 11 transmits a diagnosis result obtained by diagnostic unit 16 to information terminal 70 using radio r2, for example.

Figure 29:
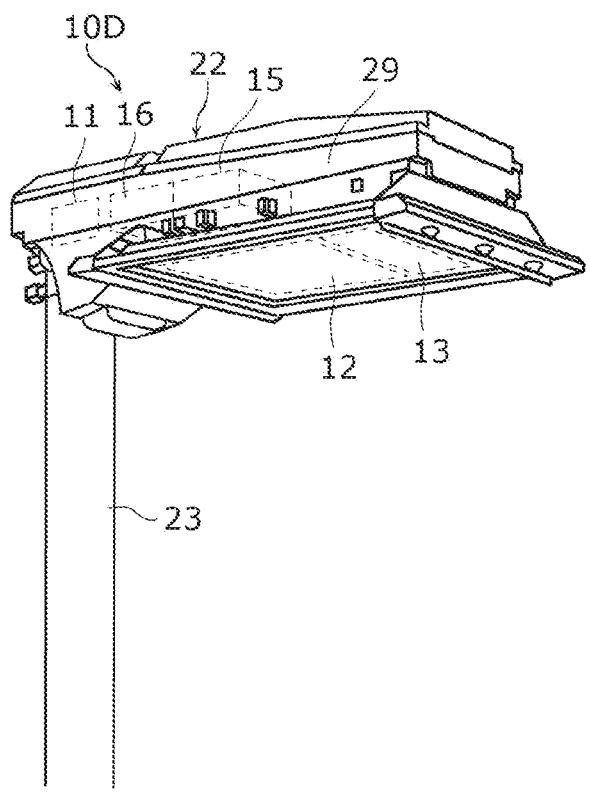
FIG. 29 is a schematic diagram illustrating a lighting device of the lighting system according to Embodiment 5.

As shown in FIG. 29, lighting device 10D has housing 29, which is a housing case. Communication unit 11, light emitter 12, detector 13, controller 15, and diagnostic unit 16 are provided in housing 29 or on an outer surface of housing 29. Housing 29 is fixed to pole body 23 with a ring member or a fastener member, for example. Communication unit 11, light emitter 12, detector 13, controller 15, and diagnostic unit 16 may be housed in pole body 23, rather than in housing 29, or may be provided in a notch or hole formed on pole body 23.

Housing 29 is provided at an upper part of pole body 23, for example, at a height of at least 4.5 m and at most 15 m from the ground surface of parking space 91. Housing 29 has a rectangular parallelepiped shape, for example, and is made of metal, resin or other materials.

Light emitter 12 emits illumination light to vehicle 50 or parking space 91. Light emitter 12 is a liquid crystal projector that projects a static image or moving image, or an LED light emitting module that emits white light. Light emitter 12 may be a combination of separate SMDs and COBs of RGB, incandescent bulb color, neutral white color or other colors. When light emitter 12 is a liquid crystal projector, lighting device 10D can notify information regarding the hacking of vehicle 50 by using a static image or moving image.

Detector 13 is a sensor that detects vehicle 50 in parking space 91. Detector 13 is an image sensor, an infrared sensor, or a laser sensor, for example. Detector 13 is constantly operating, and constantly detects the presence or absence of vehicle 50 in a predetermined area of parking space 91. Detection information from detector 13 is output to controller 15.

Controller 15 is a circuit that controls operations of communication unit 11, light emitter 12, detector 13, and diagnostic unit 16. Controller 15 is formed by a microprocessor, memory 15a, and a program stored in memory 15a, for example. Memory 15a stores identification information on information terminal 70.

When detector 13 detects vehicle 50 capable of autonomous driving, controller 15 issues a diagnosis command to diagnostic unit 16 to start diagnosis of vehicle 50.

Instead of using detector 13 to detect whether or not vehicle 50 is autonomously driving, controller 15 may establish a communication with vehicle 50, which is triggered by visible light communication from light emitter 12 to vehicle 50, and obtain information for determining whether or not vehicle 50 is autonomously driving. Alternatively, instead of using detector 13 to detect whether or not vehicle 50 is autonomously driving, controller 15 may determine whether or not vehicle 50 autonomously driving by requesting for information for determining whether or not vehicle 50 is autonomously driving from parked vehicle 50 by regularly transmitting a beacon signal from communication unit 11.

Diagnostic unit 16 is a circuit that diagnoses, via communication unit 11, whether vehicle 50 is being hacked. Diagnostic unit 16 performs diagnosis of the presence of hacking when light emitter 12 is in the off state or on state, and diagnostic unit 16 has received a diagnosis command from controller 15, for example.

There are three examples of the vehicle diagnosis by diagnostic unit 16.

A first diagnosis example is an example in which a vehicle diagnosis is performed based on an answer to a question asked to vehicle 50 by lighting device 10D. Diagnostic unit 16 asks vehicle 50 a plurality of questions, and determines whether vehicle 50 is being hacked based on at least one of the answering time or the answer tendency to the questions.

A second diagnosis example is an example in which a vehicle diagnosis is performed by checking the resilience of software that runs a travel system provided in vehicle 50. Diagnostic unit 16 checks the resilience of the software in vehicle 50 via communication unit 11, and diagnoses that vehicle 50 is being hacked when the resilience level is lower than a predetermined level.

A third diagnosis example is an example in which an operation log of vehicle 50 is obtained, and a vehicle diagnosis is performed based on the operation log. Diagnostic unit 16 obtains the operation log of vehicle 50 via communication unit 11, and diagnoses that vehicle 50 has been hacked when vehicle 50 is not following a predetermined operational regulation.

When diagnostic unit 16 has diagnosed that vehicle 50 is being hacked, controller 15 notifies information terminal 70 that vehicle 50 is being hacked.

Information terminal 70 is a terminal, such as a smartphone, a tablet terminal, or a personal computer (PC). Application software for browsing information on the diagnosis result of vehicle 50 is installed in information terminal 70. Information terminal 70 obtains information on the diagnosis result from lighting device 10D by radio r2, and displays the information on a screen.

The owner having obtained information on the diagnosis result from information terminal 70 can immediately take measures to cope with the hacked vehicle 50. In this way, damage due to the hacking of vehicle 50 can be reduced.

In another example of the notification of the diagnosis result, lighting system 1D may notify a computer communicatively connected to lighting system 1D via a network of the diagnosis result (see FIG. 28). For example, lighting system 1D may transmit the diagnosis result to a management server that is a computer owned by a dealer of vehicle 50. Lighting system 1D may also notify of the diagnosis result by transmitting an e-mail to an e-mail address registered by the owner or dealer in advance. This allows the owner or dealer to take measures to cope with the hacked vehicle 50 and reduce damage due to the hacking of vehicle 50.

[5-2. Operation of Lighting System]

Figure 30:
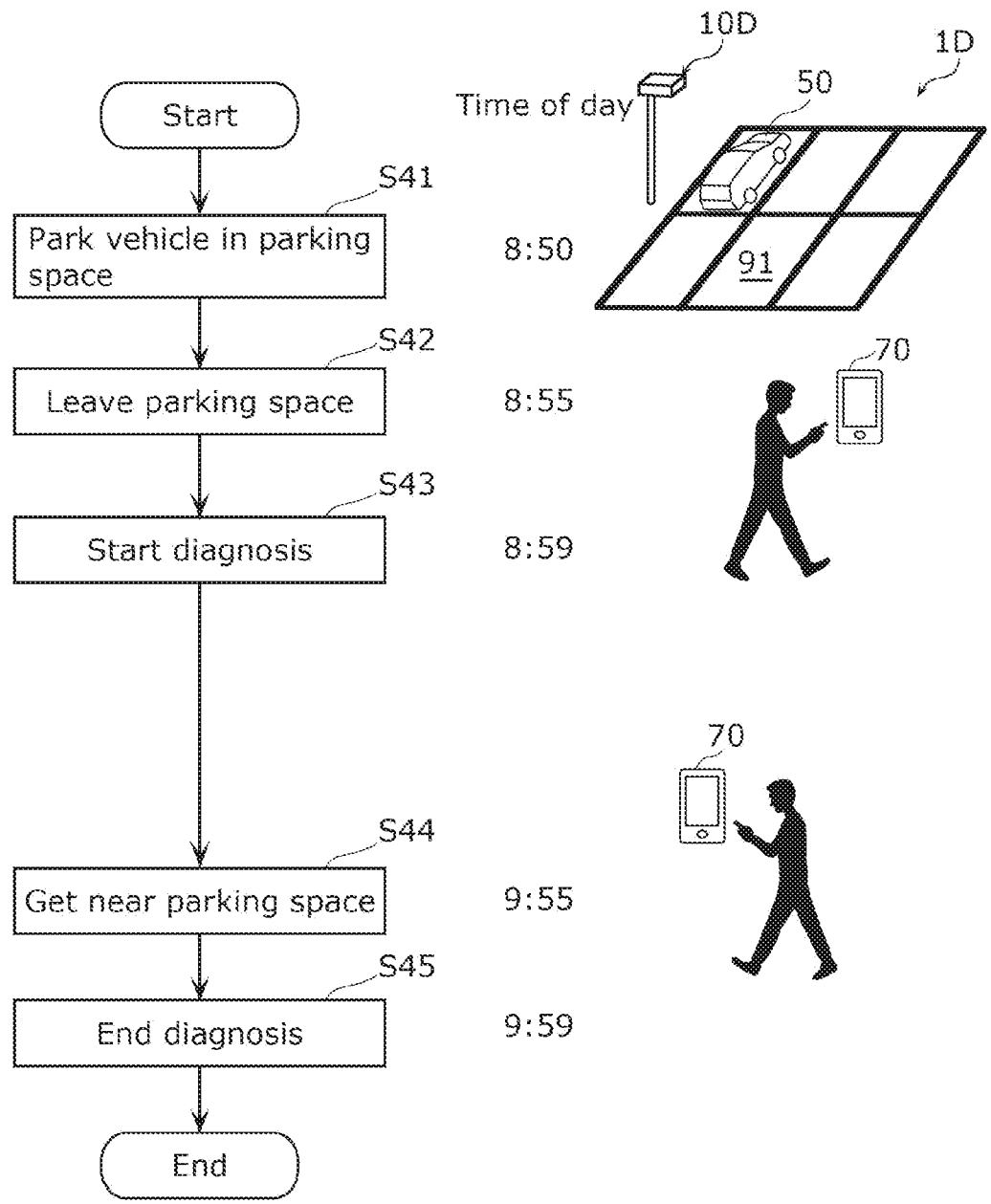
FIG. 30 is a flowchart illustrating an example of an operation of the lighting system according to Embodiment 5.

Next, an operation of lighting system 1D according to Embodiment 5 will be described, FIG. 30 is a flowchart illustrating an example of an operation of lighting system 1D.

First, the owner of vehicle 50 parks vehicle 50 in parking space 91 (Step S41).

After vehicle 50 is parked in parking space 91, when the owner holding information terminal 70 leaves a predetermined distance or more from parking space 91 (Step S42), lighting system 1D starts diagnosis of vehicle 50 (Step S43). The predetermined distance is a distance from an entrance/exit of parking space 91 to a different place than parking space 91 or a passage, and is greater than or equal to 5 m or greater than or equal to 10 m, for example. Lighting system 1D can obtain information on whether the owner has left parking space 91 the predetermined distance or more from parking space 91 by loading position information on information terminal 70.

When the owner comes within a predetermined distance from parking space 91 in order to use vehicle 50 (Step S44), lighting system 1D ends the diagnosis of vehicle 50 (Step S45). When ending the vehicle diagnosis, lighting system 1D records the diagnosis result in memory 15a. With lighting system 1D, the presence of hacking of vehicle 50 can be diagnosed at an opportunity where vehicle 50 is parked in parking space 91. In this way, damage due to the hacking of vehicle 50 can be reduced.

Embodiment 6

A configuration of lighting system 1E according to Embodiment 6 will be described with reference to FIG. 31 to FIG. 32. In Embodiment 6, an example will be described in which vehicle 50 that is traveling, vehicle 50 that is stopped, and vehicle 50 that is parked are diagnosed.

Figure 31:
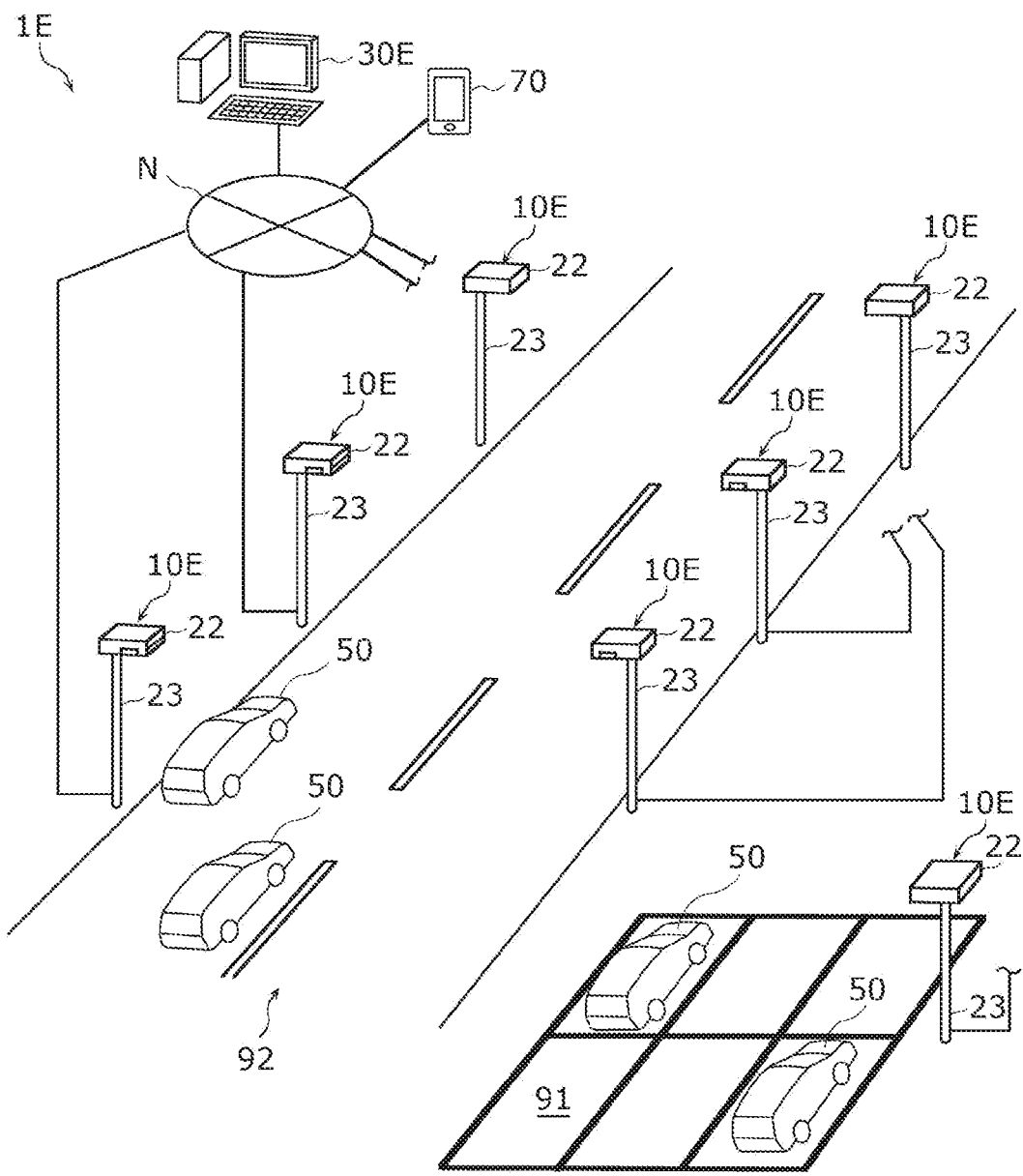
FIG. 31 is a schematic diagram illustrating a lighting system according to Embodiment 6.

FIG. 31 is a schematic diagram illustrating lighting system 1E. As shown in FIG. 31, Lighting system 1E includes a plurality of lighting devices 10E provided at a side of road 92 and parking space 91, and vehicle diagnostic device 30E communicatively connected to the plurality of lighting devices 10E via network N, such as the Internet. FIG. 31 also illustrates information terminal 70 communicatively connected to vehicle diagnostic device 30E via network N.

Lighting device 10E is a device that emits illumination light to road 92 and parking space 91, and is an outdoor lighting device, such as a street light or a security light.

Lighting device 10E includes pole body 23 installed at a side of road 92 or parking space 91, and lamp 22 provided on pole body 23.

Pole body 23 is a columnar member, and is a utility pole on which a distribution line is provided, a pole of a street light, or a pole to which a security camera is attached, for example. Pole body 23 may have an L-shape or T-shape. A plurality of pole bodies 23 are arranged at predetermined intervals, such as intervals of at least 20 m and at most 50 m, along an edge of road 92, and a plurality of lamps 22 are also arranged at the same predetermined intervals.

Figure 32:
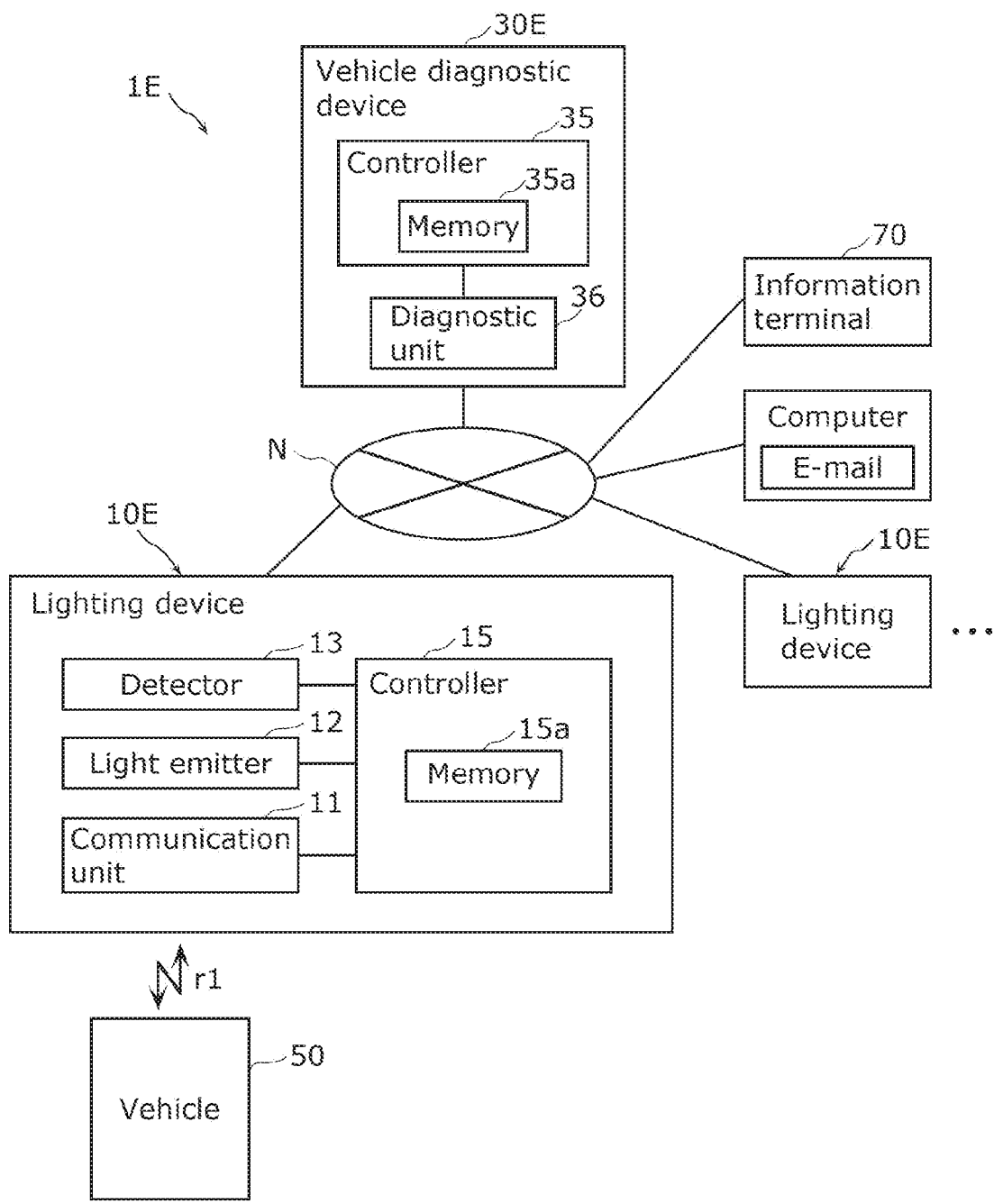
FIG. 32 is a block diagram illustrating a configuration of the lighting system according to Embodiment 6.

FIG. 32 is a block diagram illustrating a configuration of lighting system 1E. FIG. 32 also illustrates a computer communicatively connected to lighting system 1E via a network.

As shown in FIG. 32, lighting device 10E includes communication unit 11, light emitter 12, detector 13, and controller 15. Vehicle diagnostic device 30E includes controller 35 and diagnostic unit 36.

Communication unit 11 is a communication module that communicates with vehicle 50 by radio r1, and communicates with vehicle diagnostic device 30E by wire. Communication unit 11 transmits detection information from detector 13 to vehicle diagnostic device 30E via network N, for example.

Lamp 22 has housing 29, which is a housing case. Communication unit 11, light emitter 12, detector 13, and controller 15 are provided in housing 29 or on an outer surface of housing 29. Housing 29 is fixed to pole body 23 with a ring member or a fastener member, for example. Communication unit 11, light emitter 12, detector 13, and controller 15 may be housed in pole body 23, rather than in housing 29, or may be provided in a notch or hole formed on pole body 23.

Housing 29 is provided at an upper part of pole body 23, for example, at a height of at least 4.5 m and at most 15 m from the ground surface of road 92. Housing 29 has a rectangular parallelepiped shape, for example, and is provided on pole body 23 so as to protrude toward the center of road 92 from pole body 23. Housing 29 is made of metal, resin or other materials.

Light emitter 12 emits illumination light to road 92, parking space 91, and vehicle 50. Light emitter 12 is a liquid crystal projector that projects a static image or moving image, or an LED light emitting module that emits white light. Light emitter 12 may be a combination of separate SMDs and COBs RGB, incandescent bulb color, neutral white color or other colors. When light emitter 12 is a liquid crystal projector, lighting device 10E can notify information regarding the hacking of vehicle 50 by using a static image or moving image.

Detector 13 is a sensor that detects vehicle 50 on road 92 or in parking space 91. Detector 13 is provided in each of a plurality of pole bodies 23 installed along road 92 and a plurality of pole bodies 23 installed in parking space 91 as shown in FIG. 31. Detector 13 is an image sensor, an infrared sensor, or a laser sensor, for example. Detector 13 is constantly operating, and constantly detects the presence or absence of vehicle 50 in a predetermined area of road 92 or parking space 91. Detection information from detector 13 is output to vehicle diagnostic device 30E via controller 15 and communication unit 11.

Controller 15 of lighting device 10E is a circuit that controls operations of communication unit 11, light emitter 12, and detector 13. Controller 15 is formed by a microprocessor, memory 15a, and a program stored in memory 15a, for example.

Controller 35 of vehicle diagnostic device 30E is formed by a microprocessor, memory 35a, and a program stored in memory 35a, for example. Memory 35a stores identification information on vehicle 50, such as a license plate number. An operation log and a diagnosis result of vehicle 50 are also recorded in memory 35a.

When detector 13 detects vehicle 50 capable of autonomous driving and controller 35 obtains the detection information via network N, controller 35 issues a diagnosis command to diagnostic unit 36 to start diagnosis of vehicle 50.

Controller 35 may use detector 13 to determine whether vehicle 50 is traveling, stopped, or parked. Controller 35 may also use an acceleration sensor or the like provided in vehicle 50 to determine whether vehicle 50 is traveling, stopped, or parked.

Instead of using detector 13 to detect whether or not vehicle is autonomously driving, controller 35 may establish a communication with vehicle 50, which is triggered by visible light communication from light emitter 12 to vehicle 50, and obtain information for determining whether or not vehicle 50 is autonomously driving. Alternatively, instead of using detector 13 to detect whether or not vehicle 50 is autonomously driving, controller 35 may determine whether or not vehicle 50 is autonomously driving by requesting for information for determining whether or not vehicle 50 is autonomously driving from traveling or parked vehicle 50 by regularly transmitting a beacon signal from communication unit 11.

Diagnostic unit 36 is a circuit that diagnoses, via network N and communication unit 11, whether vehicle 50 is being hacked. When diagnostic unit 36 has received a diagnosis command from controller 35, for example, diagnostic unit 36 performs transmission and reception of data between diagnostic unit 36 and vehicle 50 via network N and communication unit 11 and performs diagnosis the presence of hacking of vehicle 50 based on the transmitted and received data. When diagnosing the presence of hacking of traveling vehicle 50, diagnostic unit 36 may perform the diagnosis by sequentially changing from one lighting device 10E to another lighting device 10E of the plurality of lighting devices 10E to communicate with vehicle 50.

There are three examples of the vehicle diagnosis by diagnostic unit 36.

A first diagnosis example is an example in which a vehicle diagnosis is performed based on an answer to a question asked to vehicle 50 by lighting device 10E. Diagnostic unit 36 asks vehicle 50 a plurality of questions via lighting device 10E, and determines whether vehicle 50 is being hacked based on at least one of the answering time or the answer tendency to the questions.

A second diagnosis example is an example in which a vehicle diagnosis is performed by checking the resilience of software that runs a travel system provided in vehicle 50. Diagnostic unit 36 checks the resilience of the software in vehicle 50 via communication unit 11 of lighting device 10E, and diagnoses that vehicle 50 is being hacked when the resilience level is lower than a predetermined level.

A third diagnosis example is an example in which an operation log of vehicle 50 is obtained, and a vehicle diagnosis is performed based on the operation log. Diagnostic unit 36 obtains the operation log of vehicle 50 via communication unit 11 of lighting device 10E, and diagnoses that vehicle 50 has been hacked when vehicle 50 is not following a predetermined operational regulation.

When diagnostic unit 36 has diagnosed that vehicle 50 is being hacked, controller 35 notifies information terminal 70 that vehicle 50 is being hacked.

Information terminal 70 is a terminal, such as a smartphone, a tablet terminal, or a PC. Application software for browsing information on the diagnosis result of vehicle 50 is installed in information terminal 70. Information terminal 70 obtains information on the diagnosis result via network N, and displays the information on a screen.

The owner having obtained information on the diagnosis result from information terminal 70 can immediately take measures to cope with the hacked vehicle 50. In this way, damage due to the hacking of vehicle 50 can be reduced.

In another example of the notification of the diagnosis result, lighting system 1E may notify a computer communicatively connected to lighting system 1E via network N of the diagnosis result (see FIG. 32). For example, lighting system 1E may transmit the diagnosis result to a management server that is a computer owned by a dealer of vehicle 50. Lighting system 1E may also notify of the diagnosis result by transmitting an e-mail to an e-mail address registered by the owner or dealer in advance. This allows the owner or dealer to take measures to cope with the hacked vehicle 50 and reduce damage due to the hacking of vehicle 50.

Figure 33:
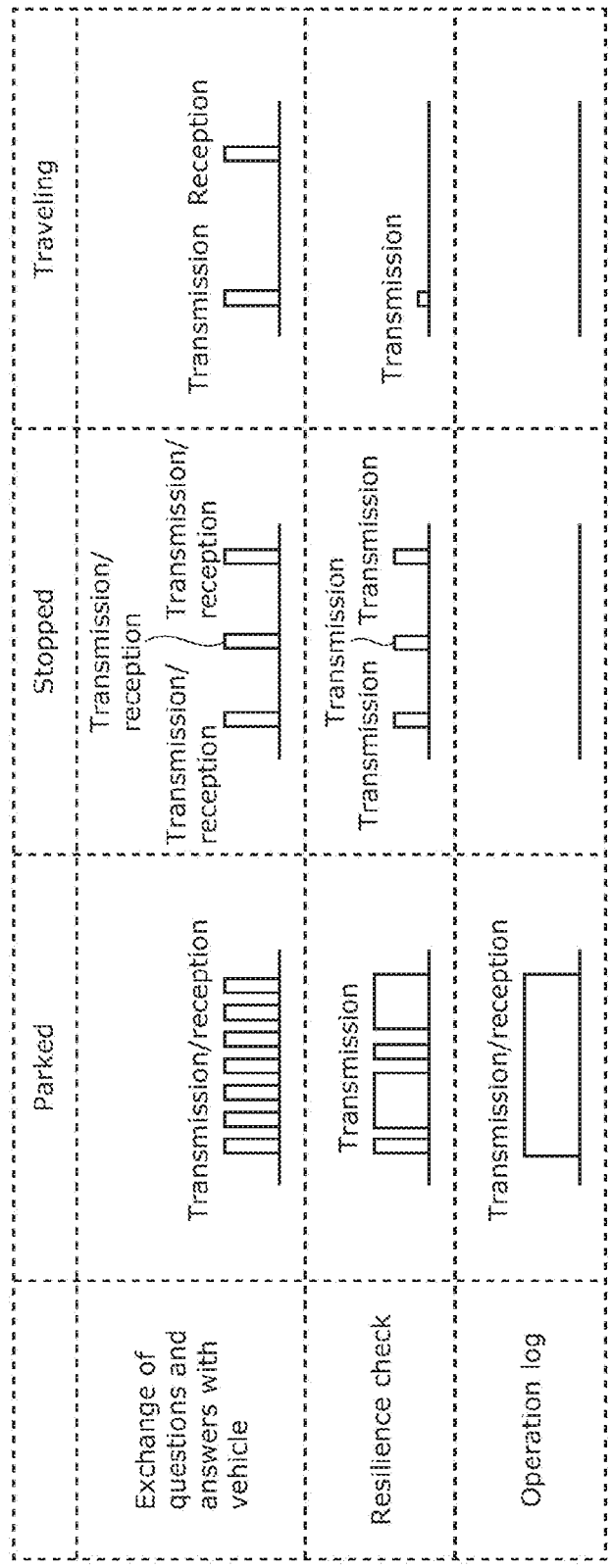
FIG. 33 is a diagram illustrating an example of operations of the lighting system according to Embodiment 6.

FIG. 33 is a diagram illustrating an example of operations of lighting system 1E. FIG. 33 illustrates that the amount of data and the timing of communication of the communication with vehicle 50 vary depending on whether vehicle 50 is parked, stopped, or traveling. That is, in the diagnosis by diagnostic unit 36 of lighting system 1E, at least one of the duration of diagnosis or the amount of diagnosis varies depending on whether vehicle 50 is parked, stopped, or traveling.

For example, when diagnostic unit 36 has determined that vehicle 50 is parked, diagnostic unit 36 may perform diagnosis by setting at least one of the duration of diagnosis or the amount of diagnosis to be greater than when vehicle 50 is traveling or stopped. When diagnostic unit 36 has determined that vehicle 50 is stopped, diagnostic unit 36 may perform diagnosis by setting at least one of the duration of diagnosis or the amount of diagnosis to be greater than when vehicle 50 is traveling and setting at least one of the duration of diagnosis or the amount of diagnosis to be smaller than when vehicle 50 is parked. When diagnostic unit 36 has determined that vehicle 50 is traveling, diagnostic unit 36 may perform diagnosis by setting at least one of the duration of diagnosis or the amount of diagnosis to be smaller than when vehicle 50 is stopped or parked.

For example, when vehicle 50 is parked, a longer duration of diagnosis and a larger amount of diagnosis can be secured, so that of the three diagnosis examples described above, the diagnosis based on questions and answers exchanged with the vehicle, the diagnosis based on the resilience check, or the diagnosis based on the operation log is performed. When vehicle 50 is stopped, the duration of diagnosis and the amount of diagnosis have to be reduced compared with when the vehicle is parked, only the diagnosis based on questions and answers or the diagnosis based on the resilience check is performed, and the diagnosis based on the operation log is not performed. When vehicle 50 is traveling, the duration of diagnosis and the amount of diagnosis have to be reduced compared with when the vehicle is stopped, the number of questions and answers exchanged with the vehicle, or the amount of data transmitted and received for checking the resilience or the number of data transmissions and receptions for checking the resilience is reduced compared with when the vehicle is stopped. When vehicle 50 is traveling, the diagnosis based on the operation log is not performed.

In this way, vehicle 50 can be appropriately diagnosed when vehicle 50 is parked, stopped, and traveling.

Embodiment 7

A configuration of lighting device 10F according to Embodiment 7 will be described with reference to FIG. 34 and FIG. 35. In Embodiment 7, an example will be described in which not only vehicle 50 but also mobile body 80, such as an unmanned aircraft, is diagnosed.

Figure 34:
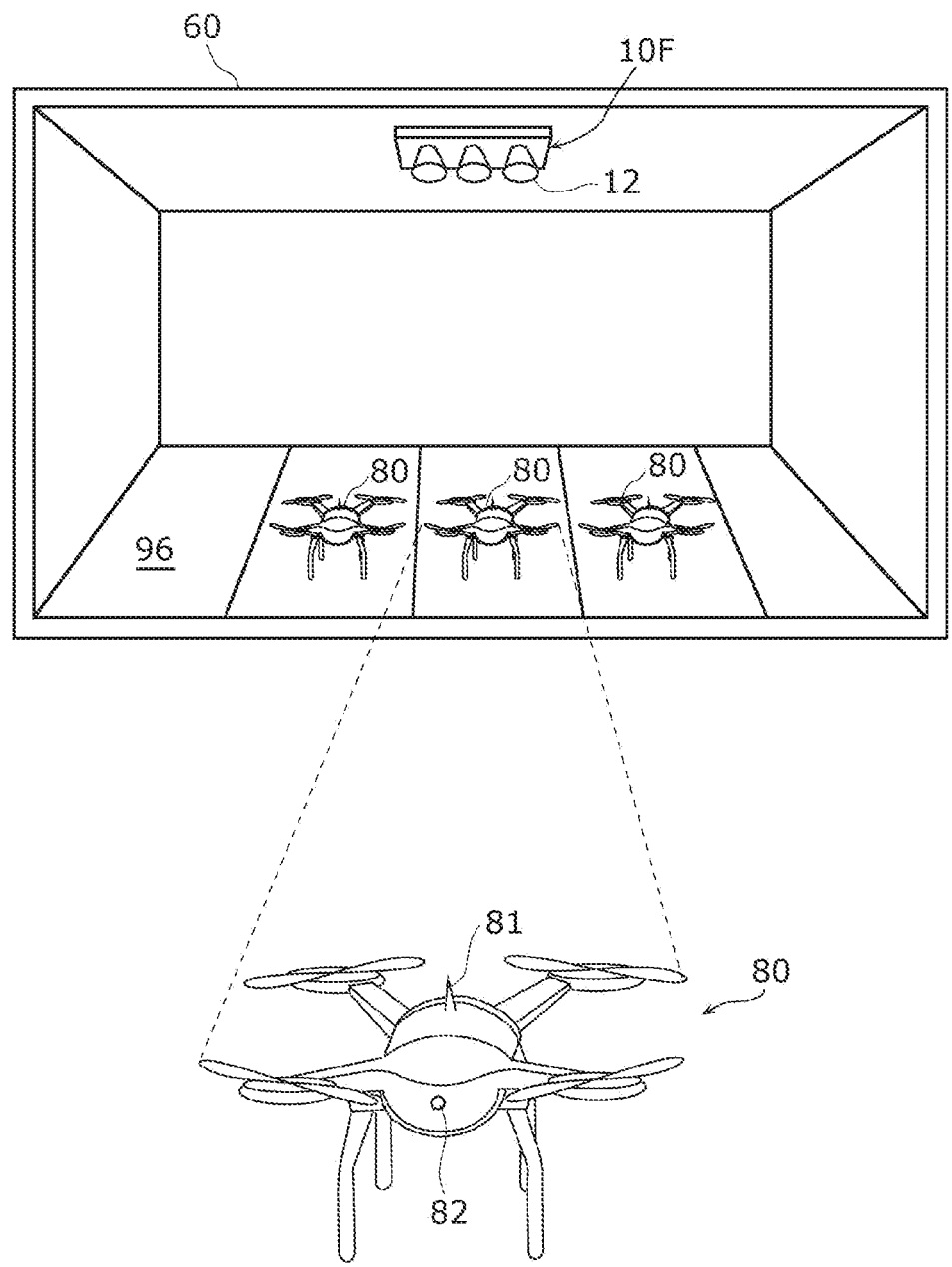
FIG. 34 is a diagram illustrating an example installation of a lighting device according to Embodiment 7.

FIG. 34 is a diagram illustrating an example installation of lighting device 10F according to Embodiment 7.

Lighting device 10F is installed in waiting area 96 in which mobile body 80 is waiting, and emits illumination light to mobile body 80 and waiting area 96. Although lighting device 10F is installed on an exterior wall of a takeoff and landing site, which is an example of building 60, in FIG. 34, the present disclosure is not limited to this, and lighting device 10F may be installed on a roof, a fence, a pillar or the like of the takeoff and landing site.

Mobile body 80 is an unmanned aircraft capable of autonomous driving, such as a drone or other air vehicles. The autonomous driving means that the mobile body drives autonomously and includes not only unmanned driving but also that the driver is assisted in manipulating the mobile body. Mobile body 80 may be an air vehicle that can switch between a manual driving mode and an autonomous driving mode. Mobile body 80 is provided with communication antenna 81 for communicating with lighting device 10F and camera 82 that recognizes illumination light from lighting device 10F. Mobile body 80 has an AI assistant function.

Figure 35:
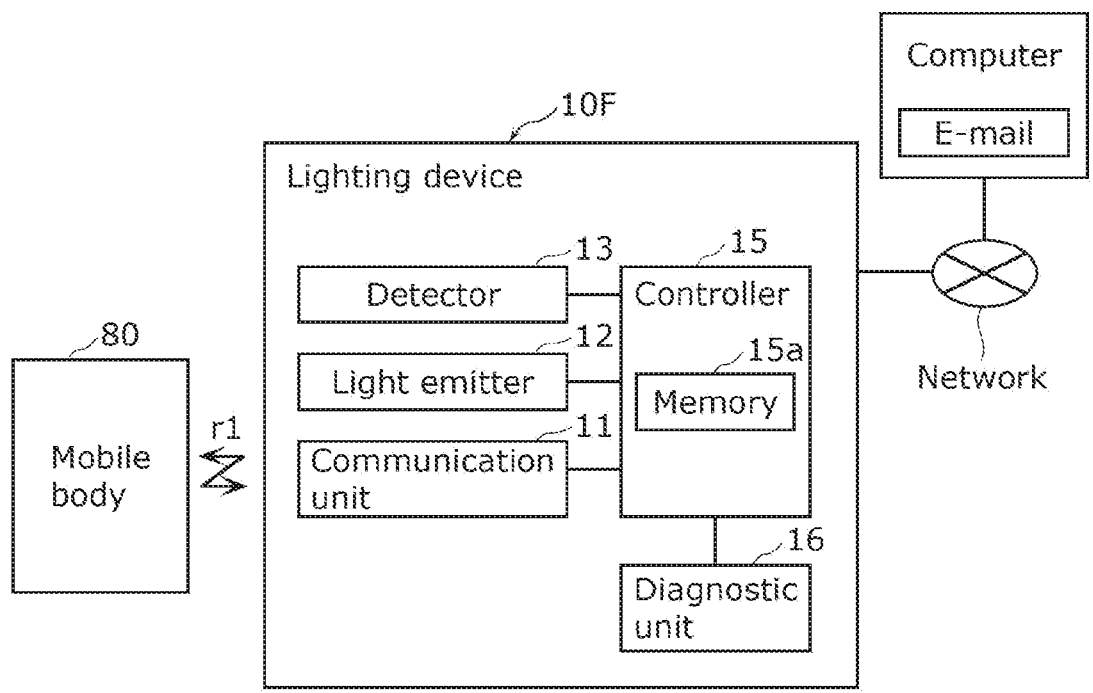
FIG. 35 is a block diagram illustrating a configuration of the lighting device according to Embodiment 7.

FIG. 35 is a block diagram illustrating a configuration of lighting device 10F. FIG. 35 also illustrates a computer communicatively connected to lighting device 10F via a network.

As shown in FIG. 35, lighting device 10F includes communication unit 11 that communicates with mobile body 80, light emitter 12 that can emit illumination light, detector 13 that detects mobile body 80, and diagnostic unit 16 that diagnoses mobile body 80 as to whether an autonomous driving program of mobile body 80 is being hacked. Lighting device 10F further includes controller 15 that controls turning on and off, dimming, and toning of light emitter 12.

Light emitter 12 is a light source that emits illumination light, and is a liquid crystal projector that projects a static image or moving image or an LED light emitting module that emits light of red color, green color, or blue color, or synthetic light of these colors, for example. Light emitter 12 may be a combination of separate SMDs and COBs of RGB, incandescent bulb color, neutral white color, or other colors. Light emitter 12 is provided at a position higher than the height of mobile body 80 waiting on the ground, in order to illuminate mobile body 80 and surroundings of mobile body 80.

Detector 13 is a sensor that detects the presence or absence of mobile body 80 in waiting area 96, such as an image sensor, an infrared sensor, or a laser sensor. Detector 13 is constantly operating, and detects whether mobile body 80 is waiting in waiting area 96. In the present embodiment, light emitter 12 is turned on in response to detector 13 detecting mobile body 80, and diagnostic unit 16 is enabled to diagnose mobile body 80 in response to turning on of light emitter 12.

Communication unit 11 is a communication module that communicates with mobile body 80 by radio r1. The communication scheme based on radio r1 may be Bluetooth®, a specified low power radio using a frequency in the 920 MHz band, Zigbee®, or WiFi®, for example.

Controller 15 is formed by a microprocessor, memory 15a, and a program stored in memory 15a, for example. Memory 15a stores identification information on mobile body 80, such as a mobile body number. An operation log and a diagnosis result of mobile body 80 described later are also recorded in memory 15a. Controller 15 controls turning on and the like of light emitter 12, and controls operations of communication unit 11, detector 13, and diagnostic unit 16.

When detector 13 detects mobile body 80, for example, controller 15 transmits, to mobile body 80, a request signal that requests for the identification information on mobile body 80 via communication unit 11. Controller 15 issues a diagnosis command to diagnostic unit 16 to make diagnostic unit 16 diagnose mobile body 80, when the identification information on mobile body 80 transmitted from mobile body 80 agrees with identification information registered in advance.

Instead of transmitting the request signal described above, controller 15 may establish a communication with mobile body 80, which is triggered by visible light communication from light emitter 12 to mobile body 80, and obtain the identification information on mobile body 80. Controller 15 may obtain the identification information on mobile body 80 by imaging the mobile body number plate by means of detector 13. Instead of using detector 13, controller 15 may obtain the identification information on mobile body 80 by requesting for transmission of the identification information from mobile body 80 by regularly transmitting a beacon signal from communication unit 11. That is, controller 15 may detect mobile body 80 by means of communication unit 11 and then perform diagnosis via communication unit 11.

Diagnostic unit 16 is a circuit that diagnoses, via communication unit 11, whether mobile body 80 is being hacked. When the lighting state of light emitter 12 changes, for example, diagnostic unit 16 performs diagnosis of mobile body 80 waiting in waiting area 96. Specifically, diagnostic unit 16 performs diagnosis of the presence of hacking of mobile body 80 when light emitter 12 changes from the off state to the on state and diagnostic unit 16 has received a diagnosis command from controller 15.

Diagnostic unit 16 may perform diagnosis of the presence of hacking of mobile body 80 not only when light emitter 12 changes from the off state to the on state but also when light emitter 12 changes from the on state to the off state or the dimmed state or when the lighting color changes. Furthermore, diagnostic unit 16 may end the diagnosis of the presence of hacking of mobile body 80 when the lighting state changes again after light emitter 12 changes from the on state to the off state or the dimmed state or after the lighting color changes. Note that the dimmed state is a state in which a toning control is being performed so that the brightness of the light is less than or equal to a predetermined brightness, for example, a state where the lighting is controlled so that the illuminance is 30%. That the lighting color changes means a state where a toning control is performed so that the color temperature changes.

There are three examples of the diagnosis of mobile body 80 by diagnostic unit 16, which are the same as those described above.

A first diagnosis example is an example in which diagnosis of mobile body 80 is performed based on an answer to a question asked to mobile body 80 by lighting device 10F. Diagnostic unit 16 asks mobile body 80 a plurality of questions, and determines whether mobile body 80 is being hacked based on at least one of the answering time or the answer tendency to the questions.

A second diagnosis example is an example in which diagnosis of mobile body 80 is performed by checking the resilience of software that runs a travel system (flight system) provided in mobile body 80. Diagnostic unit 16 checks the resilience of the software in mobile body 80 via communication unit 11, and diagnoses that mobile body 80 is being hacked when the resilience level is lower than a predetermined level.

A third diagnosis example is an example in which an operation log (flight record) of mobile body 80 is obtained, and diagnosis of mobile body 80 is performed based on the operation log. Diagnostic unit 16 obtains the operation log of mobile body 80 via communication unit 11, and diagnoses that mobile body 80 has been hacked when mobile body 80 is not following a predetermined operational regulation.

When diagnostic unit 16 has diagnosed that mobile body 80 is being hacked, controller 15 notifies of the hacking of mobile body 80 using illumination light from light emitter 12. For example, when light emitter 12 is a liquid crystal projector, controller 15 notifies information regarding hacking by illuminating mobile body 80 or waiting area 96 with a static image or moving image projected by light emitter 12.

In this way, a user of mobile body 80 can visually know whether mobile body 80 is being hacked. Therefore, the user can take measures to cope with the hacked mobile body 80, and reduce damage due to the hacking of mobile body 80.

In another example of the notification of the diagnosis result, lighting device 10F may notify a computer communicatively connected to lighting device 10F via a network of the diagnosis result (see FIG. 35). For example, lighting device 10F may transmit the diagnosis result to a management server that is a computer owned by a dealer of mobile body 80. Lighting device 10F may also notify of the diagnosis result by transmitting an e-mail to an e-mail address registered by the owner or dealer in advance. This allows the owner or dealer to take measures to cope with the hacked mobile body 80 and reduce damage due to the hacking of mobile body 80.

Embodiment 8

A configuration of lighting system 1G according to Embodiment 8 will be described with reference to FIG. 36 and FIG. 37. In Embodiment 8, an example will be described in which mobile body 80 that is moving, mobile body 80 that is stopped, and mobile body 80 that is waiting are diagnosed.

Figure 36:
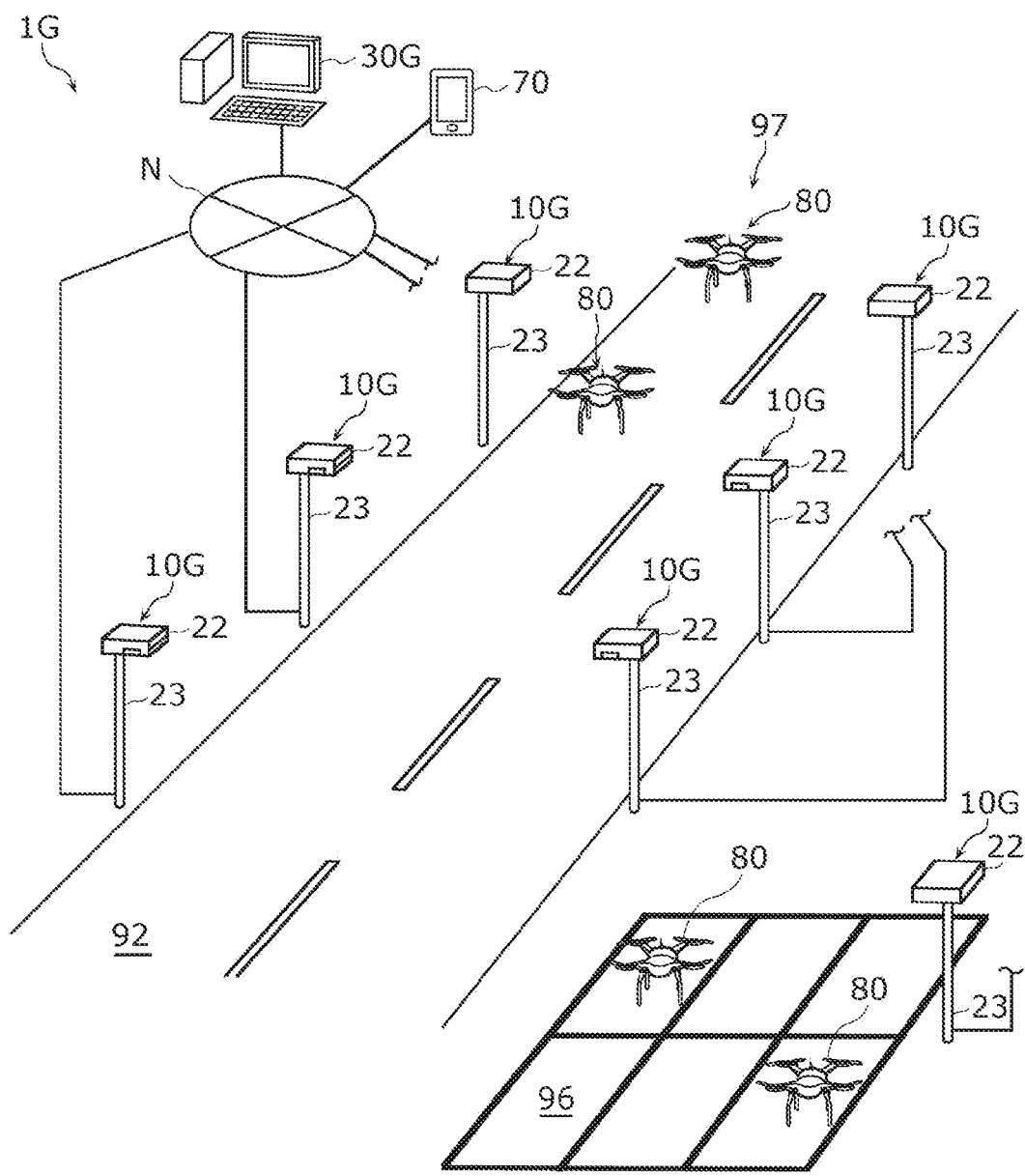
FIG. 36 is a schematic diagram illustrating a lighting system according to Embodiment 8.

FIG. 36 is a schematic diagram illustrating lighting system 1G according to Embodiment 8. FIG. 36 illustrates a plurality of mobile bodies 80 flying along travel path 97 above a road, and a plurality of mobile bodies 80 having landed in waiting area 96 provided outside the road.

Lighting system 1G according to Embodiment 8 includes a plurality of lighting devices 10G, and mobile body diagnostic device 30G communicatively connected to the plurality of lighting devices 10G via network N, such as the Internet. FIG. 36 also illustrates information terminal 70 communicatively connected to mobile body diagnostic device 30G via network N.

Lighting device 10G is a device that emits illumination light to road 92 that is parallel with travel path 97 along which mobile body 80 moves, and waiting area 96 in which mobile body 80 is waiting, and is an outdoor lighting device, such as a street light or a security light.

Lighting device 10G includes pole body 23 installed at a side of road 92 below travel path 97 or waiting area 96, and lamp 22 provided on pole body 23.

Pole body 23 is a columnar member, and is a utility pole on which a distribution line is provided, a pole of a street light, or a pole to which a security camera is attached, for example. Pole body 23 may have an L-shape or T-shape. A plurality of pole bodies 23 are arranged at predetermined intervals, such as intervals of at least 20 m and at most 50 m, along an edge of road 92, and a plurality of lamps 22 are also arranged at the same predetermined intervals. Mobile body 80 may select travel path 97 based on light emitted by a plurality of lamps 22.

Figure 37:
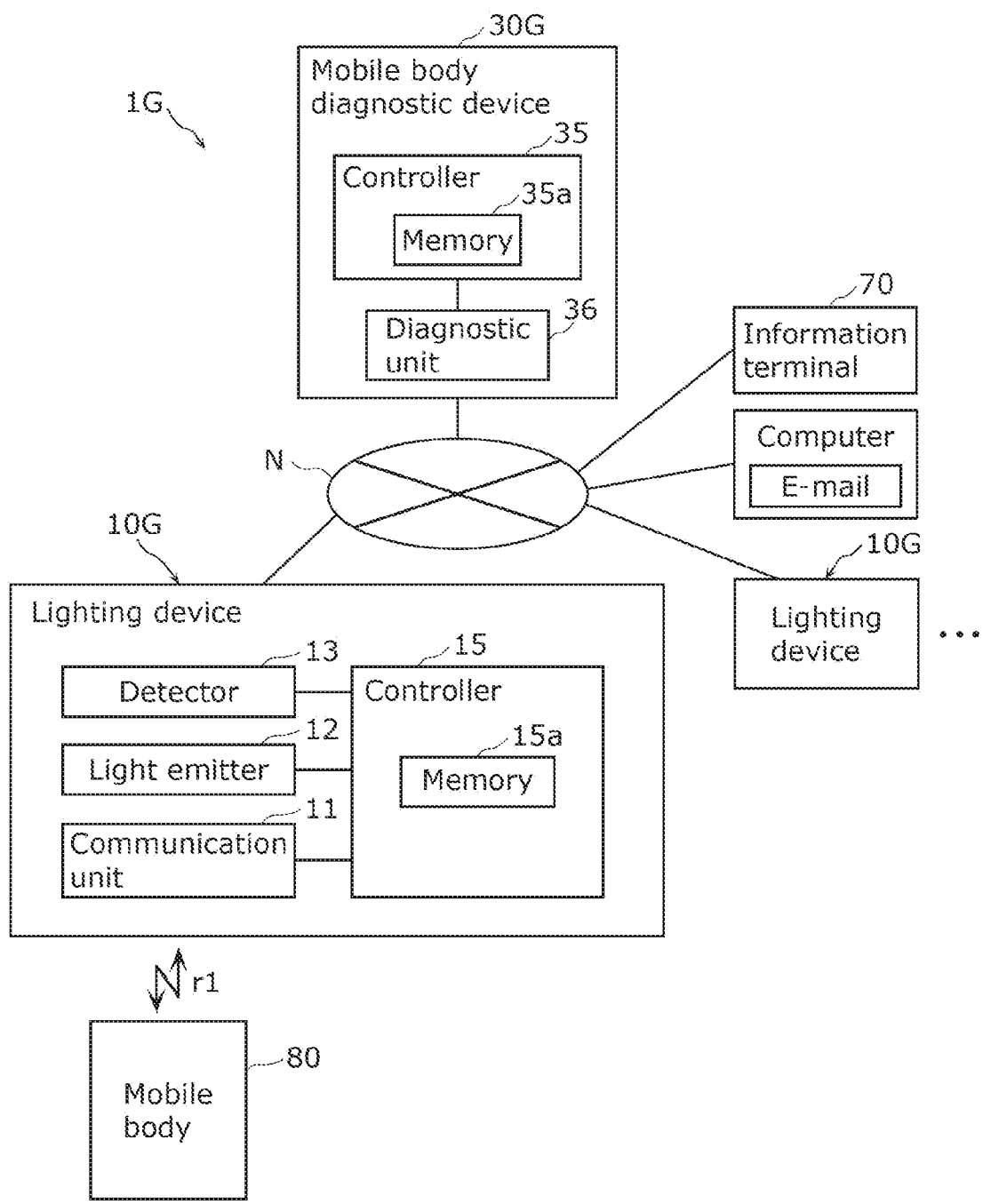
FIG. 37 is a block diagram illustrating a configuration of the lighting system according to Embodiment 8.

FIG. 37 is a block diagram illustrating a configuration of lighting system 1G. FIG. 37 also illustrates a computer communicatively connected to lighting system 1G via a network.

As shown in FIG. 37, lighting device 10G includes communication unit 11, light emitter 12, detector 13, and controller 15. Mobile body diagnostic device 30G includes controller 35 and diagnostic unit 36.

Communication unit 11 is a communication module that communicates with mobile body 80 by radio r1, and communicates with mobile body diagnostic device 30G by wire. Communication unit 11 transmits detection information from detector 13 to mobile body diagnostic device 30G via network N, for example.

Lamp 22 has housing 29, which is a housing case. Communication unit 11, light emitter 12, detector 13, and controller 15 are provided in housing 29 or on an outer surface of housing 29. Housing 29 is fixed to pole body 23 with a ring member or a fastener member, for example. Communication unit 11, light emitter 12, detector 13, and controller 15 may be housed in pole body 23, rather than in housing 29, or may be provided in a notch or hole formed on pole body 23.

Housing 29 is provided at an upper part of pole body 23 that is lower than travel path 97 of mobile body 80. Housing 29 has a rectangular parallelepiped shape, for example, and is provided on pole body 23 so as to protrude toward the center of travel path 97 from pole body 23. Housing 29 is made of metal, resin or other materials.

Light emitter 12 emits illumination light to road 92 that is parallel with travel path 97, waiting area 96, or mobile body 80. Light emitter 12 is a liquid crystal projector that projects a static image or moving image, or an LED light emitting module that emits white light. Light emitter 12 may be a combination of separate RGB, incandescent, neutral or other SMDs and COBs. When light emitter 12 is a liquid crystal projector, lighting device 10G can notify information regarding the hacking of mobile body 80 by using a static image or moving image.

Detector 13 is a sensor that detects mobile body 80 on travel path 97 or in waiting area 96. Detector 13 is provided in each of a plurality of pole bodies 23 installed along travel path 97 and road 92 and a plurality of pole bodies 23 installed in waiting area 96 as shown in FIG. 36. Detector 13 is an image sensor, an infrared sensor, or a laser sensor, for example. Detector 13 is constantly operating, and constantly detects the presence or absence of mobile body 80 in a predetermined area of travel path 97 or waiting area 96. Detection information from detector 13 is output to mobile body diagnostic device 30G via controller 15 and communication unit 11.

Controller 15 of lighting device 10G is a circuit that controls operations of communication unit 11, light emitter 12, and detector 13. Controller 15 is formed by a microprocessor, memory 15a, and a program stored in memory 15a, for example.

Controller 35 of mobile body diagnostic device 30G is formed by a microprocessor, memory 35a, and a program stored in memory 35a, for example. Memory 35a stores identification information on mobile body 80, such as a mobile body number. An operation log and a diagnosis result of mobile body 80 are also recorded in memory 35a.

When detector 13 detects mobile body 80 capable of autonomous driving, and controller 35 receives the detection information via network N, controller 35 issues a diagnosis command to diagnostic unit 36 to start diagnosis of mobile body 80.

Controller 35 may use detector 13 to determine whether mobile body 80 is moving, stopped, or waiting. Controller 35 may also use an acceleration sensor or the like provided in mobile body 80 to determine whether mobile body 80 is moving, stopped, or waiting.

Instead of using detector 13 to detect whether or not mobile body 80 is autonomously driving, controller 35 may establish a communication with mobile body 80, which is triggered by visible light communication from light emitter 12 to mobile body 80, and obtain information for determining whether or not mobile body 80 is autonomously driving. Alternatively, instead of using detector 13 to detect whether or not mobile body 80 is autonomously driving, controller 35 may determine whether or not mobile body 80 is autonomously driving by requesting for information for determining whether or not mobile body 80 is autonomously driving from moving or waiting mobile body 80 by regularly transmitting a beacon signal from communication unit 11.

Diagnostic unit 36 is a circuit that diagnoses, via network N and communication unit 11, whether mobile body 80 is being hacked. When diagnostic unit 36 has received a diagnosis command from controller 35, for example, diagnostic unit 36 performs transmission and reception of data between diagnostic unit 36 and mobile body 80 via network N and communication unit 11 and performs diagnosis of the presence of hacking of mobile body based on the transmitted and received data. When diagnosing the presence of hacking of moving mobile body 80, diagnostic unit 36 may perform the diagnosis by sequentially changing from one lighting device 10G to another lighting device 10G of the plurality of lighting devices 10G to communicate with mobile body 80.

There are three examples of the diagnosis of mobile body 80 by diagnostic unit 36, which are the same as those described above.

A first diagnosis example is an example in which diagnosis of mobile body 80 is performed based on an answer to a question asked to mobile body 80 by lighting device 10G. Diagnostic unit 36 asks mobile body 80 a plurality of questions via lighting device 10G, and determines whether mobile body 80 is being hacked based on at least one of the answering time or the answer tendency to the questions.

A second diagnosis example is an example in which diagnosis of mobile body 80 is performed by checking the resilience of software that runs a travel system provided in mobile body 80. Diagnostic unit 36 checks the resilience of the software in mobile body 80 via communication unit 11 of lighting device 10G, and diagnoses that mobile body 80 is being hacked when the resilience level is lower than a predetermined level.

A third diagnosis example is an example in which an operation log (flight record) of mobile body 80 is obtained, and diagnosis of mobile body 80 is performed based on the operation log. Diagnostic unit 36 obtains the operation log of mobile body 80 via communication unit 11 of lighting device 10G, and diagnoses that mobile body 80 has been hacked when mobile body 80 is not following a predetermined operational regulation.

When diagnostic unit 36 has diagnosed that mobile body 80 is being hacked, controller 35 notifies information terminal 70 that mobile body 80 is being hacked.

Information terminal 70 is a terminal, such as a smartphone, a tablet terminal, or a PC. Application software for browsing information on the diagnosis result of mobile body 80 is installed in information terminal 70. Information terminal 70 obtains information on the diagnosis result via network N, and displays the information on a screen.

The owner having obtained information on the diagnosis result from information terminal 70 can immediately take measures to cope with the hacked mobile body 80. In this way, damage due to the hacking of mobile body 80 can be reduced.

In another example of the notification of the diagnosis result, lighting system 1G may notify a computer communicatively connected to lighting system 1G via network N of the diagnosis result (see FIG. 37). For example, lighting system 1G may transmit the diagnosis result to a management server that is a computer owned by a dealer of mobile body 80. Lighting system 1G may also notify of the diagnosis result by transmitting an e-mail to an e-mail address registered by the owner or dealer in advance. This allows the owner or dealer to take measures to cope with the hacked mobile body 80 and reduce damage due to the hacking of mobile body 80.

SUMMARY

As described above, lighting device 10 according to the foregoing embodiments includes: communication unit 11 that communicates with vehicle 50 which drives autonomously; diagnostic unit 16 that performs, via communication unit 11, diagnosis as to whether vehicle 50 is being hacked; and light emitter 12 that emits illumination light onto at least one of vehicle 50, road 92 on which vehicle 50 travels, or parking space 91 in which vehicle 50 parks.

Since lighting device 10 can diagnose whether vehicle 50 is being hacked, damage due to the hacking of vehicle 50 can be reduced.

Furthermore, diagnostic unit 16 may perform the diagnosis on vehicle 50 which is parked in parking space 91, when a lighting state of light emitter 12 changes.

Accordingly, triggered by a change that occurs in daily life, such as the changing of the lighting state of light emitter 12, it is possible to diagnose whether vehicle 50 is being hacked. Furthermore, since vehicle 50 is parked in parking space 91, sufficient diagnosis over a long time can be performed. With this, damage due to the hacking of vehicle 50 can be reduced. Moreover, since the diagnosis can be made according to the changing of the lighting state of light emitter 12, the trouble that the user has to go through in order to start the diagnosis of vehicle 50 can be reduced.

Furthermore, diagnostic unit 16 may perform the diagnosis when light emitter 12 changes from an on state to an off state or a dimmed state or changes lighting color.

Accordingly, triggered by a change that occurs in daily life, such as light emitter 12 changing from the on state to the off state or a dimmed state, or changing lighting color, it is possible to diagnose whether vehicle 50 is being hacked. Furthermore, since vehicle 50 is not driven over a long time when light emitter 12 has changed to the off state or the dimmed state, or has changed lighting color, sufficient diagnosis over a long time can be performed. With this, damage due to the hacking of vehicle 50 can be reduced.

Furthermore, diagnostic unit 16 may end the diagnosis when the lighting state of light emitter 12 changes again after changing from the on state to the off state or the dimmed state, or after changing the lighting color.

As described above, by ending the diagnosis when the lighting state of light emitter 12 changes again, diagnosis of the hacking of vehicle 50 can be made a part of the changes in daily life. With this, damage due to the hacking of vehicle 50 can be reduced.

Furthermore, communication unit 11 may start communication with vehicle 50, with visible light communication from light emitter 12 to vehicle 50 as a trigger.

Accordingly, since a trigger for communication between communication unit 11 and vehicle 50 can be certainly created, diagnosis of vehicle 50 which makes use of communication can be certainly performed. With this, damage due to the hacking of vehicle 50 can be reduced.

Furthermore, when diagnostic unit 16 diagnoses that vehicle 50 is being hacked, light emitter 12 may notify that vehicle 50 is being hacked, by using an illumination light of light emitter 12.

Accordingly, a user of vehicle 50 can visually know whether vehicle 50 is being hacked. With this, the user can take measures to cope with vehicle 50 that has been hacked, and thus damage due to the hacking of vehicle 50 can be reduced.

Furthermore, light emitter 12 may perform the notification by projecting the illumination light onto at least one of vehicle 50 or parking space 91.

Accordingly, a user of vehicle 50 can know with certainty whether vehicle 50 is being hacked. With this, the user can take measures to cope with vehicle 50 that has been hacked and thus damage due to the hacking of vehicle 50 can be reduced.

Furthermore, when diagnostic unit 16 diagnoses that vehicle 50 is being hacked, lighting device 10 may notify a computer communicatively connected to lighting device 10 that vehicle 50 is being hacked.

Accordingly, a user of vehicle 50 can, through a computer, know with certainty whether vehicle 50 is being hacked. With this, the user can take measures to cope with vehicle 50 that has been hacked and thus damage due to the hacking of vehicle 50 can be reduced.

Furthermore, when diagnostic unit 16 diagnoses that vehicle 50 is being hacked, lighting device 10 may notify that vehicle 50 is being hacked, by sending an electronic mail to a pre-registered mail address.

Accordingly, a user having the registered mail address can, through electronic mail, know with certainty whether vehicle 50 is being hacked. With this, the user can take measures to cope with vehicle 50 that has been hacked and thus damage due to the hacking of vehicle 50 can be reduced.

Furthermore, diagnostic unit 16 may perform the diagnosis based on an answer to a question to vehicle 50.

Accordingly, it is possible to diagnose whether vehicle 50 is being hacked, based on the answer to the question. With this, damage due to the hacking of vehicle 50 can be reduced.

Furthermore, diagnostic unit 16 may perform the diagnosis based on at least one of an answering time or an answering tendency to a plurality of questions.

Accordingly, it is possible to appropriately diagnose whether vehicle 50 is being hacked. With this, damage due to the hacking of vehicle 50 can be reduced.

Furthermore, diagnostic unit 16 may ask vehicle 50 a question having a uniquely-determined answer via communication unit 11, and diagnose that vehicle 50 is being hacked when the answering time to the question is slower than a predetermined time.

Accordingly, it is possible to easily diagnose whether vehicle 50 is being hacked. With this, damage due to the hacking of vehicle 50 can be reduced.

Furthermore, diagnostic unit 16 may ask vehicle 50 questions having answers that are non-uniquely-determined via communication unit 11, and diagnose that vehicle 50 is being hacked when an amount of variation in the answers to the questions is smaller than a predetermined amount of variation.

Accordingly, it is possible to diagnose, with an advanced perspective, whether vehicle 50 is being hacked. With this, damage due to the hacking of vehicle 50 can be reduced.

Furthermore, diagnostic unit 16 may perform the diagnosis by checking resilience of software which runs a travel system provided in vehicle 50, via communication unit 11.

Accordingly, it is possible to diagnose whether vehicle 50 is being hacked, based on the resilience of the software. With this, damage due to the hacking of vehicle 50 can be reduced.

Furthermore, diagnostic unit 16 may diagnose that vehicle 50 is being hacked when a level of the resilience of the software is lower than a predetermined level.

Accordingly, it is possible to certainly diagnose whether vehicle 50 is being hacked. With this, damage due to the hacking of vehicle 50 can be reduced.

Furthermore, diagnostic unit 16 may check the resilience of the software by performing at least one of a denial-of-service (DoS) attack or a buffer overflow attack on the software.

Accordingly, it is possible to prevent a hacker from hacking vehicle 50. With this, damage due to the hacking of vehicle 50 can be reduced.

Furthermore, when the DoS attack causes the level of the resilience of the software to become lower than the predetermined level, diagnostic unit 16 may continue the DoS attack until the software ceases to function.

Accordingly, since it is possible to cause the loss of the travel function of vehicle 50, damage due to the hacking of vehicle 50 can be reduced.

Furthermore, diagnostic unit 16 may check the resilience of the software by performing transmission of trap data to the software.

Accordingly, the hacker performing the hacking can be lured out. With this, it is possible to reduce damage due to the hacking of vehicle 50.

Furthermore, when a backdoor to the software is found through the transmission of the trap data, diagnostic unit 16 may diagnose that the level of the resilience of the software is lower than the predetermined level and that vehicle 50 is being hacked.

Accordingly, it is possible to diagnose the presence of hacking through the presence of a backdoor in the software. With this, it is possible to reduce damage due to the hacking of vehicle 50.

Furthermore, diagnostic unit 16 may obtain an operation log of vehicle 50 via communication unit 11, and perform the diagnosis based on the operation log.

Accordingly, it is possible to perform sufficient diagnosis using the operation log. With this, damage due to the hacking of vehicle 50 can be reduced.

Furthermore, diagnostic unit 16 may determine that vehicle 50 is being hacked when diagnostic unit 16 confirms, based on the operation log, that vehicle 50 is not following a predetermined operational regulation.

In this manner, sufficient diagnosis can be performed by confirming that an operational regulation is not being followed. With this, it is possible to reduce damage due to the hacking of vehicle 50.

Furthermore, diagnostic unit 16 may perform the diagnosis with at least one of a diagnosis time or a diagnosis amount which is different depending on whether vehicle 50 is parked, stopped, or traveling.

Accordingly, it is possible to perform an appropriate diagnosis that is suited to the state in which vehicle 50 is in, such as parked, stopped, traveling, etc. With this, damage due to the hacking of vehicle 50 can be reduced.

Furthermore, when vehicle 50 is determined to be parked, diagnostic unit 16 may perform the diagnosis with the at least one of the diagnosis time or the diagnosis amount set to a greater value than when vehicle 50 is traveling or stopped.

Accordingly, it is possible to perform an appropriate diagnosis on vehicle 50 which is stopped. With this, it is possible to reduce damage due to the hacking of vehicle 50.

Furthermore, when vehicle 50 is determined to be stopped, diagnostic unit 16 may perform the diagnosis with the at least one of the diagnosis time or the diagnosis amount set to value which is greater than a value set when vehicle 50 is traveling and less than a value set when vehicle 50 is parked.

Accordingly, it is possible to perform an appropriate diagnosis on vehicle 50 which is stopped. With this, it is possible to reduce damage due to the hacking of vehicle 50.

Furthermore, when vehicle 50 is determined to be traveling, diagnostic unit 16 may perform the diagnosis with the at least one of the diagnosis time or the diagnosis amount set to a lesser value than when vehicle 50 is stopped or parked.

Accordingly, even when vehicle 50 is traveling, a matching appropriate diagnosis can be performed. With this, it is possible to reduce damage due to the hacking of vehicle 50.

Lighting system 1D according to the present embodiment includes the lighting device described above and information terminal 70 that communicates with the lighting device.

Accordingly, information as to whether vehicle 50 is being hacked can be sent to information terminal 70. With this, a user which obtains the information can immediately take measures to cope with vehicle 50 that has been hacked. With this, it is possible to reduce damage due to the hacking of vehicle 50.

Furthermore, diagnostic unit 16 may start the diagnosis when, after vehicle 50 is parked in a parking space, information terminal 70 is separated from parking space 91 by more than a predetermined distance.

With vehicle diagnostic system 1D, the presence of hacking of vehicle 50 can be diagnosed at an opportunity where vehicle 50 is parked in parking space 91. In this way, damage due to the hacking of vehicle 50 can be reduced.

Furthermore, diagnostic unit 16 of the lighting device may end the diagnosis when, after the diagnosis of vehicle 50 which is parked in parking space 91 is started, information terminal 70 comes to within a predetermined distance of parking space 91.

With vehicle diagnostic system 1D, the presence of hacking of vehicle 50 can be diagnosed at an opportunity where vehicle 50 is parked in parking space 91. In this way, damage due to the hacking of vehicle 50 can be reduced.

Lighting system 1E according to the foregoing embodiments includes: lighting device 10E including communication unit 11 that communicates with vehicle 50 which drives autonomously, and light emitter 12 that emits illumination light onto at least one of vehicle 50, road 92 on which vehicle 50 travels, or parking space 91 in which vehicle 50 parks; and vehicle diagnostic device 30E that is communicatively connected to communication unit 11 and performs, via communication unit 11, diagnosis as to whether vehicle 50 is being hacked.

Accordingly, even when vehicle 50 is traveling on road 92 or is parked in parking space 91, it is possible to perform diagnosis as to whether vehicle 50 is being hacked. With this, it is possible to reduce damage due to the hacking of vehicle 50.

Lighting system 1C according to the foregoing embodiments includes: lighting device 10C that emits illumination light onto at least one of vehicle 50 which drives autonomously, road 92 on which vehicle 50 travels, or parking space 91 in which vehicle 50 parks; and vehicle diagnostic device 30C including communication unit 31 that communicates with lighting device 10C and vehicle 50, and diagnostic unit 36 that performs, via communication unit 31, diagnosis as to whether vehicle 50 is being hacked.

Lighting system 1C can also appropriately perform diagnosis as to whether vehicle 50 is being hacked. With this, it is possible to reduce damage due to the hacking of vehicle 50.

Lighting device 10F according to the foregoing embodiments includes: communication unit 11 that communicates with mobile body 81 which drives autonomously; diagnostic unit 16 that performs, via communication unit 11, diagnosis as to whether mobile body 80 is being hacked; and light emitter 12 that emits illumination light onto at least one of mobile body 80, road 92 along travel path 97 in which mobile body 80 travels, or waiting area 96 in which mobile body 80 waits.

Since lighting device 10F can perform diagnosis as to whether mobile body 80 is being hacked, it is possible to reduce damage due to the hacking of mobile body 80.

Furthermore, mobile body 80 may be an unmanned aircraft.

Accordingly, since it is possible to diagnose whether the unmanned aircraft is being hacked, it is possible to reduce damage due to the hacking of the unmanned aircraft.

Furthermore, diagnostic unit 16 may perform the diagnosis on mobile body 80 which is waiting in waiting area 96, when the lighting state of light emitter 12 changes. Moreover, diagnostic unit 16 may perform the diagnosis when light emitter 12 changes from an on state to an off state or a dimmed state or changes lighting color. Furthermore, diagnostic unit 16 may end the diagnosis when the lighting state of light emitter 12 changes again after changing from the on state to the off state or the dimmed state, or after changing the lighting color.

Furthermore, communication unit 11 may start communication with mobile body 80, with visible light communication from light emitter 12 to mobile body 80 as a trigger.

Furthermore, when diagnostic unit 16 diagnoses that mobile body 80 is being hacked, light emitter 12 may notify that mobile body 80 is being hacked, by using the illumination light of light emitter 12. In addition, light emitter 12 may perform the notification by projecting the illumination light onto at least one of mobile body 80 or waiting area 96.

Furthermore, diagnostic unit 16 may perform the diagnosis based on an answer to a question asked to mobile body 80. Moreover, diagnostic unit 16 may perform the diagnosis by checking resilience of software which runs a travel system provided in mobile body 80, via communication unit 11. Furthermore, diagnostic unit 16 may obtain an operation log of mobile body 80 via communication unit 11, and perform the diagnosis based on the operation log.

Furthermore, lighting system 1G according to the foregoing embodiment includes: lighting device 10G which includes communication unit 11 that communicates with mobile body 80 which drives autonomously, and light emitter 12 that emits illumination light onto at least one of mobile body 80, road 92 along travel path 97 in which mobile body 80 travels, or waiting area 96 at which mobile body 80 waits; and mobile body diagnostic device 30G that is communicatively connected to communication unit 11 and performs, via communication unit 11, diagnosis as to whether mobile body 80 is being hacked.

Accordingly, even when mobile body 80 is traveling along travel path 97, or waiting at waiting area 96, it is possible to perform diagnosis as to whether mobile body 80 is being hacked. With this, it is possible to reduce damage due to the hacking of mobile body 80.

Other Embodiments

Although Embodiments 1 to 8 of the present disclosure have been described above, the present disclosure is not limited to lighting devices 10 to 10G and lighting systems 1 to 1G described above.

Although diagnostic unit 16 or 36 diagnoses vehicle 50 or the like when the lighting state of light emitter 12 changes in Embodiments 1 to 8, the present disclosure is not limited to this. For example, diagnostic unit 16 or 36 may perform diagnosis when detector 13 detects vehicle 50 or the like, even if the lighting state of light emitter 12 has not changed.

When performing diagnosis of vehicle 50 or the like by asking a question that is uniquely answered shown in FIG. 3, diagnostic unit 16 or 36 according to Embodiments 1 to 8 may diagnose that vehicle 50 or the like is being hacked when the answer to the question contains a wrong answer, a misspelling, a wrong language, or the like.

Although lighting devices including diagnostic unit 16 that diagnoses whether vehicle 50 or the like is being hacked have been described in the above embodiments, the embodiments described above can be applied to other diagnoses of vehicle 50 or the like.

For example, the lighting device may include communication unit 11 that communicates with vehicle 50 that is autonomously driving, diagnostic unit 16 that diagnoses, via communication unit 11, whether vehicle 50 has been zombified, and light emitter 12 that can emit illumination light to at least one of vehicle 50, road 92 on which vehicle 50 travels, or parking space 91 in which vehicle 50 is parked. That "vehicle 50 is zombified" means at least one of a state of vehicle 50 being hacked or a state of vehicle 50 being infected with a computer virus. Whether vehicle 50 is infected with a computer virus can be diagnosed by detecting whether a computer program that makes vehicle 50 travel is normally operating.

The operations of the lighting devices according to Embodiments 1 to 8 described above may be implemented by a program stored in memory 15a. That is, a program including a step of changing the lighting state of light emitter 12 that emits illumination light to vehicle 50, and a step of communicating with vehicle 50 using communication unit 11 to diagnose whether vehicle 50 is being hacked after the step described above may be stored in memory 15a, and the operations of lighting devices 10 to 10G may be implemented by the program stored in memory 15a.

Furthermore, each of the controllers according to above-described Embodiments 1 to 8 is implemented typically as a large-scale integration (LSI), which is an integrated circuit (IC). They may take the form of individual chips, or some or all of them may be encapsulated into a single chip.

Moreover, the integrated circuit is not limited to an LSI, and may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

It should be noted that, in foregoing Embodiments 1 to 8, the respective structural components may be implemented as dedicated hardware or may be realized by executing a software program suited to such structural components. Alternatively, the respective structural components may be implemented by a program executor such as a CPU or a processor reading out and executing the software program recorded in a recording medium such as a hard disk or a semiconductor memory.

Furthermore, the numerical figures used above are all given as examples to specifically describe the present disclosure, and thus the embodiments of the present disclosure are not limited by the numerical figures that have been given as examples.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Moreover, the functions of a plurality of functional blocks having similar functions may be processed by single hardware or software in a parallelized or time-divided manner.

Furthermore, the processing order of executing the respective steps shown in the flowcharts is a mere illustration for specifically describing the present disclosure, and thus may be an order other than the shown order. Moreover, one or more of the steps may be executed simultaneously (in parallel) with another step.

The present disclosure includes forms obtained by making various modifications to Embodiments 1 to 8 which can be conceived by those skilled in the art, as well as forms realized by arbitrarily combining structural components and functions in Embodiments 1 to 8 without departing from the essence of the present disclosure.

REFERENCE SIGNS LIST 1, 1A, 1B, 1C, 1D, 1E, 1F, 1G lighting system
10, 10A, 10C, 10D, 10E, 10F, 10G lighting device
11 communication unit
12 light emitter
13 detector
16 diagnostic unit
30B, 30C, 30E vehicle diagnostic device
30G mobile body diagnostic device
50 vehicle
70 information terminal
80 mobile body
91 parking space
92 road
96 waiting area
97 travel path

The invention claimed is:

1. A lighting device comprising:
a communication unit that communicates with a vehicle which drives autonomously;
a diagnostic unit that performs, via the communication unit, diagnosis as to whether the vehicle is being hacked;
a light emitter that emits visible illumination light onto at least one of the vehicle, or a parking space in which the vehicle parks; and
a detector that detects whether the vehicle is parked in the parking space, wherein:
the light emitter turns on to emit the visible illumination light when the detector detects the vehicle parked in the parking space, and
the diagnostic unit performs the diagnosis on the vehicle which is parked in the parking space, in response to the light emitter turning on.

2. The lighting device according to claim 1, wherein the diagnostic unit ends the diagnosis when the lighting state of the light emitter changes after changing from the on state to the off state or the dimmed state, or after changing the lighting color.

3. The lighting device according to claim 1, wherein the communication unit starts communication with the vehicle, with visible light communication from the light emitter to the vehicle as a trigger.

4. The lighting device according to claim 1, wherein when the diagnostic unit diagnoses that the vehicle is being hacked, the light emitter notifies that the vehicle is being hacked, by using the visible illumination light of the light emitter.

5. The lighting device according to claim 4, wherein the light emitter performs the notification by projecting the visible illumination light onto at least one of the vehicle or the parking space.

6. The lighting device according to claim 1, wherein when the diagnostic unit diagnoses that the vehicle is being hacked, the lighting device notifies a computer communicatively connected to the lighting device that the vehicle is being hacked.

7. The lighting device according to claim 1, wherein when the diagnostic unit diagnoses that the vehicle is being hacked, the lighting device notifies that the vehicle is being hacked, by sending an electronic mail to a pre-registered mail address.

8. The lighting device according to claim 1, wherein the diagnostic unit performs the diagnosis based on an answer to a question to the vehicle.

9. The lighting device according to claim 8, wherein the diagnostic unit performs the diagnosis based on at least one of an answering time or an answering tendency to a plurality of questions.

10. The lighting device according to claim 9, wherein the diagnostic unit asks the vehicle a question having a uniquely-determined answer via the communication unit, and diagnoses that the vehicle is being hacked when the answering time to the question is slower than a predetermined time.

11. The lighting device according to claim 9, wherein the diagnostic unit asks the vehicle questions having answers that are non-uniquely-determined via the communication unit, and diagnoses that the vehicle is being hacked when an amount of variation in the answers to the questions is smaller than a predetermined amount of variation.

12. The lighting device according to claim 1, wherein the diagnostic unit performs the diagnosis by checking resilience of software which runs a travel system provided in the vehicle, via the communication unit.

13. The lighting device according to claim 12, wherein the diagnostic unit diagnoses that the vehicle is being hacked when a level of the resilience of the software is lower than a predetermined level.

14. The lighting device according to claim 12, wherein the diagnostic unit checks the resilience of the software by performing at least one of a denial-of-service (DOS) attack or a buffer overflow attack on the software.

15. The lighting device according to claim 14, wherein when the DOS attack causes the level of the resilience of the software to become lower than the predetermined level, the diagnostic unit continues the DOS attack until the software ceases to function.

16. The lighting device according to claim 12, wherein the diagnostic unit checks the resilience of the software by performing transmission of trap data to the software.

17. The lighting device according to claim 16, wherein when a backdoor to the software is found through the transmission of the trap data, the diagnostic unit diagnoses that the level of the resilience of the software is lower than the predetermined level and that the vehicle is being hacked.

18. The lighting device according to claim 1, wherein the diagnostic unit obtains an operation log of the vehicle via the communication unit, and performs the diagnosis based on the operation log.

19. The lighting device according to claim 18, wherein the diagnostic unit determines that the vehicle is being hacked when the diagnostic unit confirms, based on the operation log, that the vehicle is not following a predetermined operational regulation.

20. The lighting device according to claim 1, wherein the diagnostic unit performs the diagnosis with at least one of a diagnosis time or a diagnosis amount which is different depending on whether the vehicle is parked, stopped, or traveling.

where
a state that the vehicle is parked refers to a state in which the vehicle is in the parking space,
a state that the vehicle is stopped refers to a state in which the vehicle is stopped on the road, and
a state that the vehicle is traveling refers to a state in which the vehicle is traveling on the road.

21. The lighting device according to claim 20, wherein when the vehicle is determined to be parked, the diagnostic unit performs the diagnosis with the at least one of the diagnosis time or the diagnosis amount set to a greater value than when the vehicle is traveling or stopped.

22. The lighting device according to claim 20, wherein when the vehicle is determined to be stopped, the diagnostic unit performs the diagnosis with the at least one of the diagnosis time or the diagnosis amount set to value which is greater than a value set when the vehicle is traveling and less than a value set when the vehicle is parked.

23. The lighting device according to claim 20, wherein when the vehicle is determined to be traveling, the diagnostic unit performs the diagnosis with the at least one of the diagnosis time or the diagnosis amount set to a lesser value than when the vehicle is stopped or parked.

24. The lighting device according to claim 1, further comprising:
an information terminal that communicates with the lighting device.

25. The lighting device according to claim 24, wherein the diagnostic unit starts the diagnosis when, after the vehicle is parked in the parking space, the information terminal is separated from the parking space by more than a predetermined distance.

26. The lighting device according to claim 24, wherein the diagnostic unit of the lighting device ends the diagnosis when, after the diagnosis of the vehicle which is parked in the parking space is started, the information terminal comes to within a predetermined distance of the parking space.

27. A lighting system comprising:
a lighting device including:
  a communication unit that communicates with a vehicle which drives autonomously;
  a light emitter that emits visible illumination light onto at least one of the vehicle, or a parking space in which the vehicle parks; and
  a detector that detects whether the vehicle is parked in the parking space; and
a vehicle diagnostic device that is communicatively connected to the communication unit and performs, via the communication unit, diagnosis as to whether the vehicle is being hacked, wherein:
the light emitter turns on to emit the visible illumination light when the detector detects the vehicle parked in the parking space, and
the vehicle diagnostic device performs the diagnosis on the vehicle which is parked in the parking space, in response to the light emitter turning on.

28. A lighting system comprising:
a lighting device that emits visible illumination light onto at least one of a vehicle which drives autonomously, or a parking space in which the vehicle parks;
a detector that detects whether the vehicle is parked in the parking space; and
a vehicle diagnostic device including:
  a communication unit that communicates with the lighting device and the vehicle; and
  a diagnostic unit that performs, via the communication unit, diagnosis as to whether the vehicle is being hacked, wherein:
the light emitter turns on to emit the visible illumination light when the detector detects the vehicle parked in the parking space, and
the vehicle diagnostic device performs the diagnosis on the vehicle which is parked in the parking space, in response to the light emitter turning on.

29. A lighting device comprising:
a communication unit that communicates with a mobile body which drives autonomously;
a diagnostic unit that performs, via the communication unit, diagnosis as to whether the mobile body is being hacked;
a light emitter that emits visible illumination light onto at least one of the mobile body, or a waiting area in which the mobile body waits; and
a detector that detects whether the mobile body is waiting at the waiting area, wherein:
the light emitter turns on to emit the visible illumination light when the detector detects the mobile body waiting at the waiting area, and
the diagnostic device performs the diagnosis on the mobile body which stays at the waiting area, in response to the light emitter turning on.

30. The lighting device according to claim 29, wherein the mobile body is an unmanned aircraft.

* * * * *